(12) United States Patent
Nabeta

(10) Patent No.: US 11,747,816 B2
(45) Date of Patent: Sep. 5, 2023

(54) AUTONOMOUS TRAVELING CONTROL DEVICE, AUTONOMOUS TRAVELING CONTROL SYSTEM, AND AUTONOMOUS TRAVELING CONTROL METHOD

(71) Applicant: Sony Group Corporation, Tokyo (JP)

(72) Inventor: Masaomi Nabeta, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 64 days.

(21) Appl. No.: 17/611,909

(22) PCT Filed: May 15, 2020

(86) PCT No.: PCT/JP2020/019418
§ 371 (c)(1),
(2) Date: Nov. 17, 2021

(87) PCT Pub. No.: WO2020/241303
PCT Pub. Date: Dec. 3, 2020

(65) Prior Publication Data
US 2022/0229438 A1 Jul. 21, 2022

(30) Foreign Application Priority Data

May 27, 2019 (JP) .................................. 2019-098868

(51) Int. Cl.
*G05D 1/02* (2020.01)
(52) U.S. Cl.
CPC .......... *G05D 1/0214* (2013.01); *G05D 1/0217* (2013.01); *G05D 1/0274* (2013.01); *G05D 2201/0213* (2013.01)
(58) Field of Classification Search
CPC .............. G05D 1/0214; G05D 1/0217; G05D 1/0274; G05D 2201/0213
See application file for complete search history.

(56) References Cited

U.S. PATENT DOCUMENTS

| 10,490,078 B1* | 11/2019 | Fields ............... G08G 1/096838 |
| 2012/0035797 A1* | 2/2012 | Oobayashi ............. G05D 1/024 701/25 |

(Continued)

FOREIGN PATENT DOCUMENTS

| JP | 2009-217491 A | 9/2009 |
| JP | 2010-55498 A | 3/2010 |

(Continued)

OTHER PUBLICATIONS

International Search Report and Written Opinion dated Jul. 21, 2020, received for PCT Application PCT/JP2020/019418, Filed on May 15, 2020, 9 pages including English Translation.

*Primary Examiner* — Rodney A Butler
(74) *Attorney, Agent, or Firm* — XSENSUS LLP

(57) ABSTRACT

Achieved is an autonomous traveling control device which generates a safety priority path for avoiding passage through or approach to a dangerous region where a contact with another mobile object is possible, and travels along the safety priority path. The autonomous traveling control device includes a traveling path determination unit that generates a safety priority path for avoiding passage through or approach to a dangerous region where a contact with another mobile object is possible; and a traveling control unit that executes control causing the own device to travel along the safety priority path generated by the traveling path determination unit. The traveling path determination unit generates a cost priority path in a metric map on the basis of a minimum cost path in a topology map, and generates a safety priority path bypassing the dangerous region by correcting the cost priority path in the metric map.

12 Claims, 26 Drawing Sheets

(56) References Cited

U.S. PATENT DOCUMENTS

| | | | |
|---|---|---|---|
| 2018/0174485 A1* | 6/2018 | Stankoulov | G09B 19/167 |
| 2019/0056743 A1 | 2/2019 | Alesiani et al. | |
| 2020/0064831 A1* | 2/2020 | Pedersen | G08G 1/0133 |

FOREIGN PATENT DOCUMENTS

| | | |
|---|---|---|
| JP | 2010-61293 A | 3/2010 |
| JP | 2012-200818 A | 10/2012 |

* cited by examiner

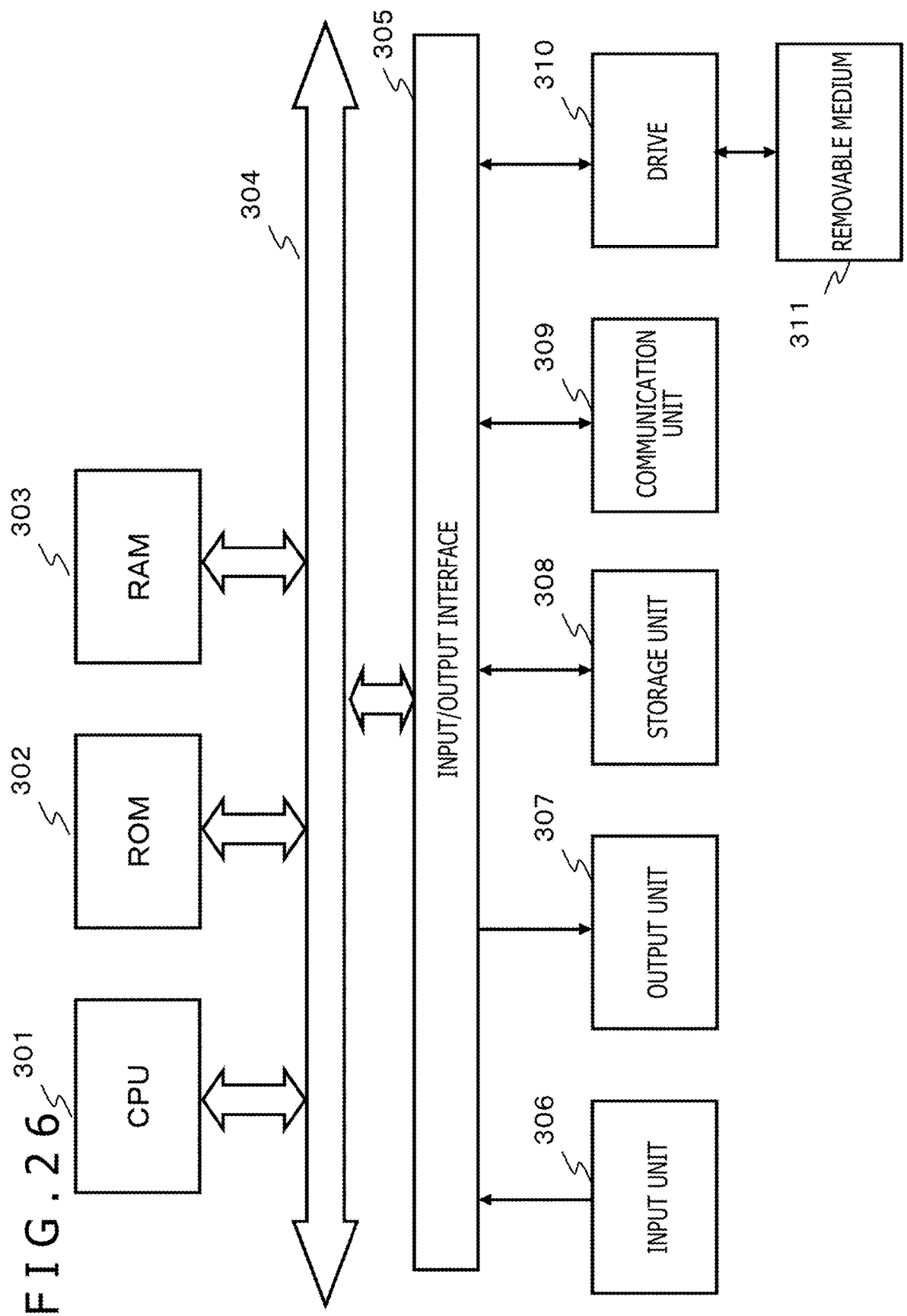

AUTONOMOUS TRAVELING CONTROL DEVICE, AUTONOMOUS TRAVELING CONTROL SYSTEM, AND AUTONOMOUS TRAVELING CONTROL METHOD

CROSS-REFERENCE TO RELATED APPLICATIONS

The present application is based on PCT filing PCT/JP2020/019418, filed May 15, 2020, which claims priority to JP 2019-098868, filed May 27, 2019, the entire contents of each are incorporated herein by reference.

TECHNICAL FIELD

The present disclosure relates to an autonomous traveling control device, an autonomous traveling control system, and an autonomous traveling control method. More specifically, the present disclosure relates to an autonomous traveling control device, an autonomous traveling control system, and an autonomous traveling control method for achieving safe traveling of an autonomous traveling robot and an autonomous traveling vehicle.

BACKGROUND ART

Development and utilization of an autonomous traveling type robot and an autonomous traveling type vehicle have been rapidly promoted in recent years. For example, development and utilization of an unmanned robot carrying a load and traveling in a warehouse or an office, an autonomous driving vehicle traveling on a road, and the like have been promoted.

The autonomous traveling type robot and the autonomous traveling type vehicle are required to travel safely while avoiding a collision with another robot or vehicle, a pedestrian, or the like.

Note that PTL 1 (JP 2010-055498 A) is known as a conventional technology disclosing a safe traveling technology for an autonomous traveling robot, for example.

This reference discloses a configuration which detects an obstacle such as a human by using a sensor or the like, and travels along a path so defined as to avoid the obstacle according to detection information so as to achieve safe traveling while preventing a collision with the obstacle.

However, there is a possibility that a pedestrian runs out from a shade or a side road, for example. In this case, it is often difficult for the sensor of the autonomous traveling robot to detect the human present in the shade or the side road, and therefore prevention of a collision is difficult in such a situation.

CITATION LIST

Patent Literature

[PTL 1]
JP 2010-055498 A

SUMMARY

Technical Problem

The present disclosure has been developed in consideration of the above-mentioned problem, for example. An object of the present disclosure is to provide an autonomous traveling control device, an autonomous traveling control system, and an autonomous traveling method for achieving safe traveling while reducing a possibility of a collision with a mobile object such as a human running out from a region difficult to detect by a sensor of an autonomous traveling robot or a vehicle.

Solution to Problem

A first aspect of the present disclosure is directed to an autonomous traveling control device including a traveling path determination unit that generates a safety priority path for avoiding passage through or approach to a dangerous region where a contact with another mobile object is possible, and a traveling control unit that executes control causing the own device to travel along the safety priority path generated by the traveling path determination unit.

Moreover, a second aspect of the present disclosure is directed to an autonomous traveling control system including an autonomous traveling device, and a server that transmits a safety priority path to the autonomous traveling device, in which the server generates a safety priority path for avoiding passage through or approach to a dangerous region where a contact between the autonomous traveling device and another mobile object is possible, and transmits generated safety priority path information to the autonomous traveling device, and the autonomous traveling device receives the safety priority path information from the server, and executes control causing the own device to travel along the received safety priority path.

Furthermore, a third aspect of the present disclosure is directed to an autonomous traveling control method executed by an autonomous traveling control device, the autonomous traveling control method including a traveling path determination step of generating, by a traveling path determination unit, a safety priority path for avoiding passage through or approach to a dangerous region where a contact with another mobile object is possible, and a traveling control step of executing, by a traveling control unit, control causing the own device to travel along the safety priority path generated by the traveling path determination unit.

Further objects, features, and advantages of the present disclosure will become apparent from more detailed description based on an embodiment of the present disclosure described below or accompanying drawings. Note that a system in the present description is a logical set of configurations constituted by a plurality of devices, and that the devices of the respective configurations are not required to be contained in an identical housing.

Provided according to a configuration of one embodiment of the present disclosure is an autonomous traveling control device which generates a safety priority path for avoiding passage through or approach to a dangerous region where a contact with another mobile object is possible, and travels along the safety priority path.

Specifically, for example, the autonomous traveling control device includes a traveling path determination unit that generates a safety priority path for avoiding passage through or approach to a dangerous region where a contact with another mobile object is possible, and a traveling control unit that executes control causing the own device to travel along the safety priority path generated by the traveling path determination unit. The traveling path determination unit generates a cost priority path in a metric map on the basis of a minimum cost path in a topology map, and generates a safety priority path bypassing the dangerous region by correcting the cost priority path in the metric map.

The present configuration achieves an autonomous traveling control device which generates a safety priority path for avoiding passage through or approach to a dangerous region where a contact with another mobile object is possible, and travels along the safety priority path.

Note that advantageous effects to be produced are not limited to those described in the present description presented only by way of example. Moreover, additional advantageous effects may be produced.

BRIEF DESCRIPTION OF DRAWINGS

FIG. 26 is a diagram explaining a hardware configuration example of the autonomous traveling control device of the present disclosure and a server.

DESCRIPTION OF EMBODIMENT

Figure 1:
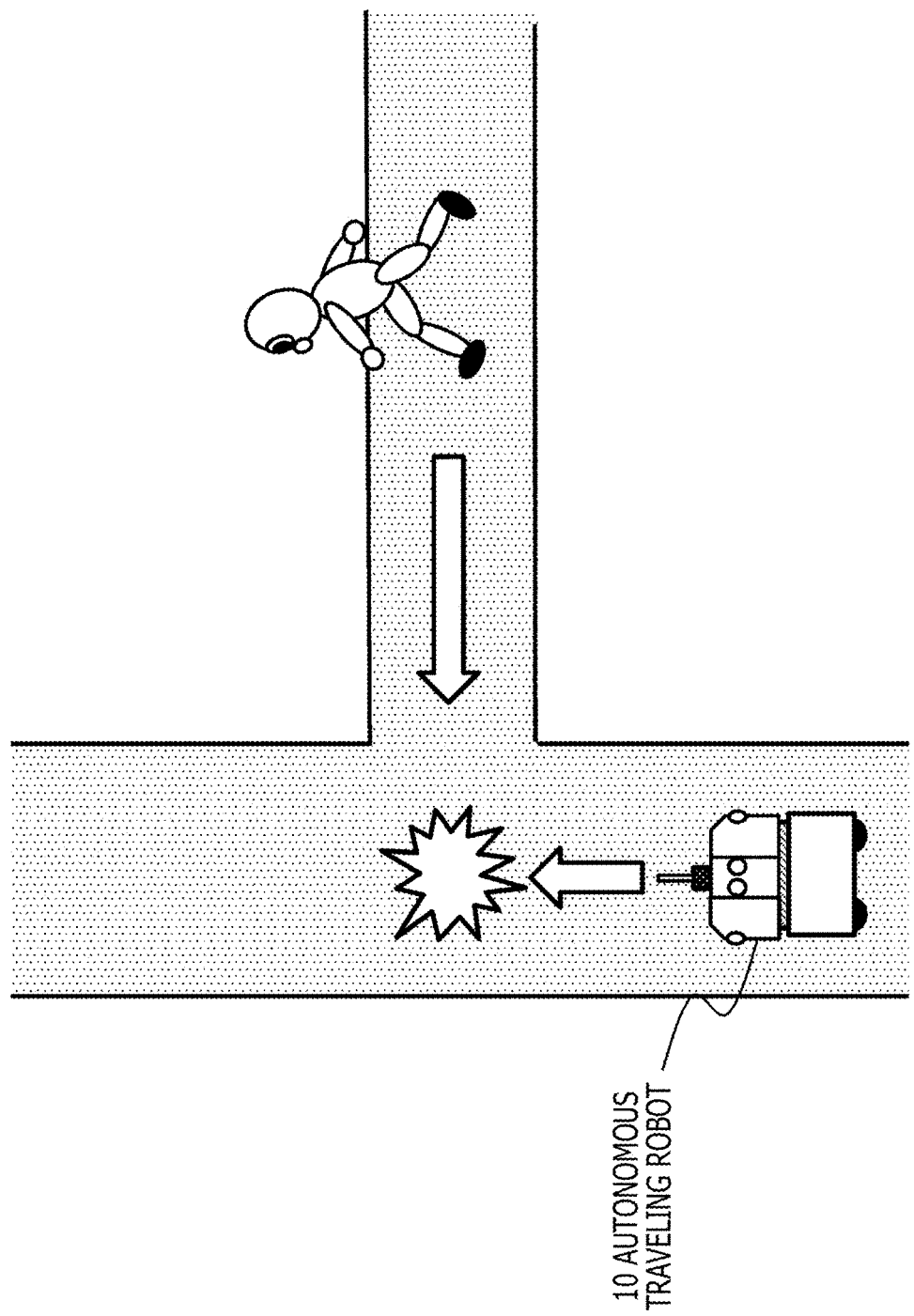
FIG. 1 is a diagram explaining a problem arising from autonomous traveling control.

Details of an autonomous traveling control device, an autonomous traveling control system, and an autonomous traveling control method of the present disclosure will be hereinafter described with reference to the drawings. Note that the description will be presented according to following items.

1. Problems arising from autonomous traveling control, and outline of autonomous traveling control process of present disclosure 2. Configuration example of autonomous traveling control device and autonomous traveling control system of present disclosure 3. Process executed by autonomous traveling control device of present disclosure 4. Specific example of generation process of safety priority path 5. Setting examples of safety priority path corresponding to various dangerous regions 6. Setting examples of safety priority path corresponding to dangerous region in parking lot 7. Configuration example of autonomous traveling control device 8. Configuration example of vehicle control system, and example of sensing regions of vehicle 9. Display data example of display unit 10. Hardware configuration example of respective devices 11. Summary of configuration of present disclosure

[1. Problems Arising from Autonomous Traveling Control, and Outline of Autonomous Traveling Control Process of Present Disclosure]

Initially described will be problems arising from autonomous traveling control, and an outline of an autonomous traveling control process of the present disclosure.

FIG. 1 is a diagram depicting a traveling example of an autonomous traveling robot 10. A T-junction is formed in a traveling direction (arrow direction) of the autonomous traveling robot 10. A human is running from a right side.

In a case where the human continues to run in a state of continuous traveling of the autonomous traveling robot 10, a collision will be caused at a crossing portion of the T-junction.

The autonomous traveling robot 10 in many cases is equipped with a sensor such as a camera and a radar. In a case of detection of an obstacle in the traveling direction by the sensor, control such as an emergency stop is executed.

However, a human or an obstacle present in a region blocked by a wall or the like is difficult to detect using the sensor such as a camera and a radar equipped on the autonomous traveling robot 10.

Figure 2:
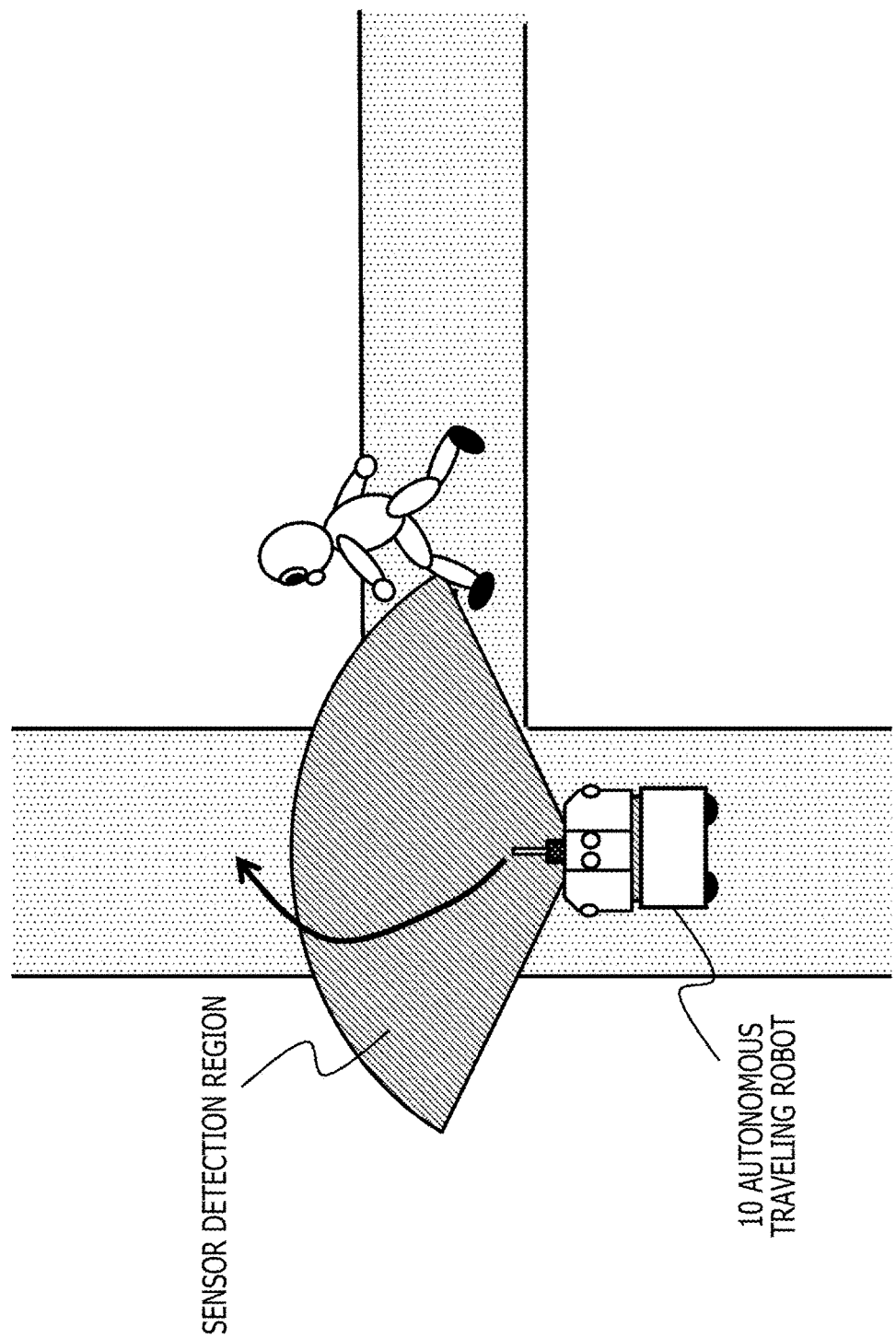
FIG. 2 is a diagram explaining a problem arising from autonomous traveling control.

Accordingly, the autonomous traveling robot 10 can detect the human running from a road side of the T-junction by using the sensor only at a spot immediately before entrance of the autonomous traveling robot 10 into the T-junction as depicted in FIG. 2. Even when a sudden stop is made by the autonomous traveling robot 10 in response to detection of the human running from the road side of the T-junction by using the sensor at the position depicted in FIG. 2, a collision or a contact between the autonomous traveling robot 10 and the human is highly likely to occur.

The present disclosure is configured to prevent the foregoing situation.

An example of a traveling control process executed by the autonomous traveling control device of the present disclosure will be described with reference to FIG. 3.

Figure 3:
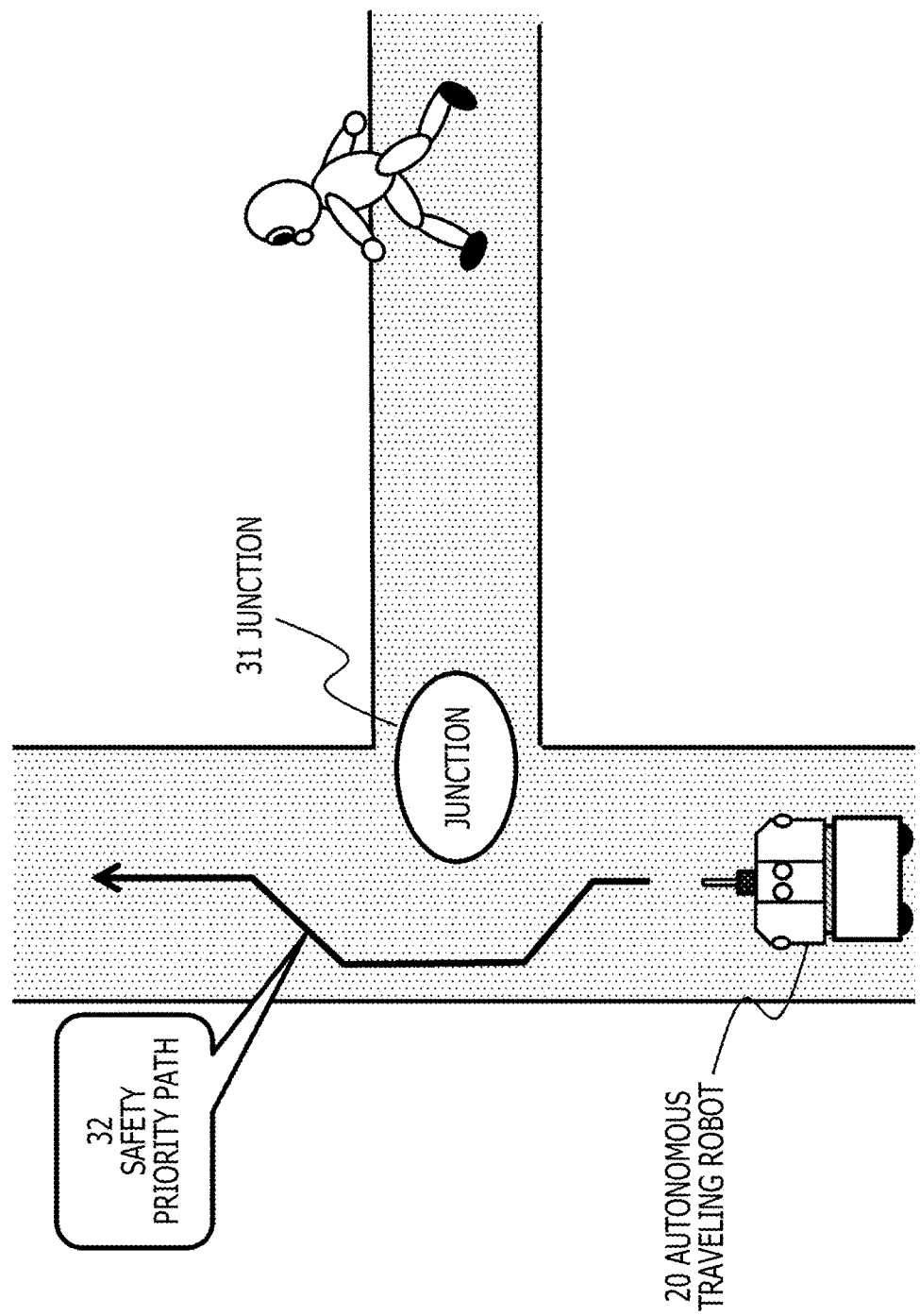
FIG. 3 is a diagram explaining an outline of autonomous traveling control of the present disclosure.

An autonomous traveling robot 20 depicted in FIG. 3 is an example of the autonomous traveling control device of the present disclosure.

The autonomous traveling robot 20 acquires beforehand information associated with a spot (dangerous region) where a danger of a collision with a mobile object such as a human and another robot or vehicle is highly likely to occur, such as a junction 21 depicted in the figure, on the basis of map information acquired beforehand, and travels along an optimum traveling path which reduces the possibility of the collision with the mobile object in this dangerous region.

A safety priority path 32 is depicted in FIG. 3.

The safety priority path 32 depicted in FIG. 3 is a traveling path set at a position away from a junction 31 corresponding to a spot (dangerous region) where a danger of a collision between the autonomous traveling robot 20 and the mobile object such as a human is highly likely to occur.

The safety priority path 32 depicted in FIG. 3 is a safety priority type traveling path set such that a central portion of a passage is designated as a traveling path at a location away from the junction 31 corresponding to the dangerous region, and that a position away from the junction 31 is designated as a traveling path at a portion near the junction 31 corresponding to the dangerous region.

A determination process for determining this safety priority path is executed in advance. For example, the determining process is executed before a traveling start of the autonomous traveling robot 20. Alternatively, the determination process is executed before the autonomous traveling robot 20 approaches a dangerous region such as the junction 31, at least immediately before the time when the autonomous traveling robot 20 comes into a state unable to stop before the junction 31 of the T-junction.

The autonomous traveling control device of the present disclosure determines beforehand a safety priority path which is a safety priority type traveling path for avoiding a dangerous region where a collision with a mobile object is highly likely to occur, such as a junction of roads or traveling paths, and executes traveling along the determined safety priority path. This process can reduce a possibility of a collision with a mobile object such as a human and another robot or automobile even in a case where obstacle detection using a sensor is difficult to achieve.

Note that the autonomous traveling control device of the present disclosure includes not only the autonomous traveling robot as depicted in FIG. 3, but also all devices performing an autonomous traveling process not requiring direct traveling control by a human, such as an autonomous driving vehicle.

[2. Configuration Example of Autonomous Traveling Control Device and Autonomous Traveling Control System of Present Disclosure]

Described next will be a configuration example of an autonomous traveling control device and an autonomous traveling control system of the present disclosure.

Figure 4:
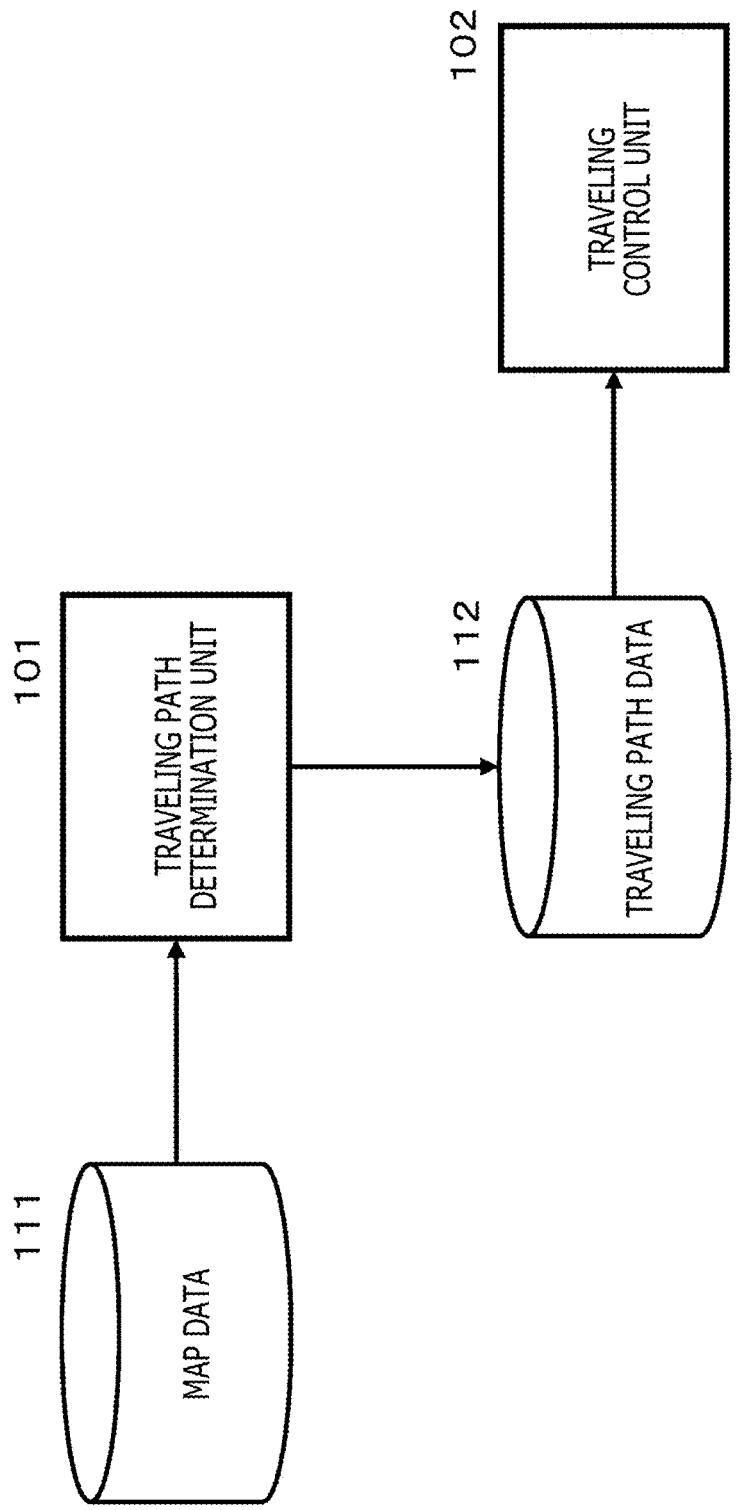
FIG. 4 is a diagram depicting a configuration example of an autonomous traveling control device of the present disclosure.

FIG. 4 is a diagram depicting a configuration example of an autonomous traveling control device 100 of the present disclosure. Note that the configuration of the autonomous traveling control device 100 depicted in FIG. 4 indicates a partial configuration of the autonomous traveling control device 100. For example, the autonomous traveling control device 100 depicted in FIG. 4 corresponds to a part of the configuration of the autonomous traveling robot 20 depicted in FIG. 3.

As depicted in FIG. 4, the autonomous traveling control device 100 includes a traveling path determination unit 101 and a traveling control unit 102. The traveling path determination unit 101 receives input of map data 111, determines a traveling path where the autonomous traveling control device 100 travels, and generates traveling path data 112.

For example, the traveling path data 112 generated by the traveling path determination unit 101 is a safety priority path avoiding a dangerous district, such as the junction 31 described above with reference to FIG. 3.

Note that the traveling path determination unit 101 may be configured to execute a traveling path determination process considering traveling paths of other autonomous traveling control devices. Traveling path information associated with other autonomous traveling control devices is acquired from an external server, or by communication between traveling devices.

The traveling control unit 102 receives input of the traveling path data 112 generated by the traveling path determination unit 101, and performs traveling control causing the autonomous traveling control device 100 to travel according to the traveling path data 112.

The traveling control unit 102 further executes traveling control based on sensor detection information obtained by a camera, a radar, or the like equipped on the autonomous traveling control device 100.

In a case where an obstacle has been detected on a traveling path by sensor detection, traveling is achieved not necessarily according to the traveling path data 112 generated by the traveling path determination unit 101, but with a setting of an emergency path which contains an emergency stop or avoids the obstacle.

Note that adoptable is either a configuration which stores the map data 111 which is used for generating the traveling path data 112 by the traveling path determination unit 101, in a storage unit in the autonomous traveling control device 100, or a configuration which inputs the map data 111 from an external server.

Note that the autonomous traveling control device 100 depicted in FIG. 1 and including the traveling path determination unit 101 and the traveling control unit 102 may be configured such that the traveling path determination unit 101 is provided not within the autonomous traveling control device 100 but within an external server.

A configuration example of the autonomous traveling control system 120 having this configuration will be described with reference to FIG. 5.

Figure 5:
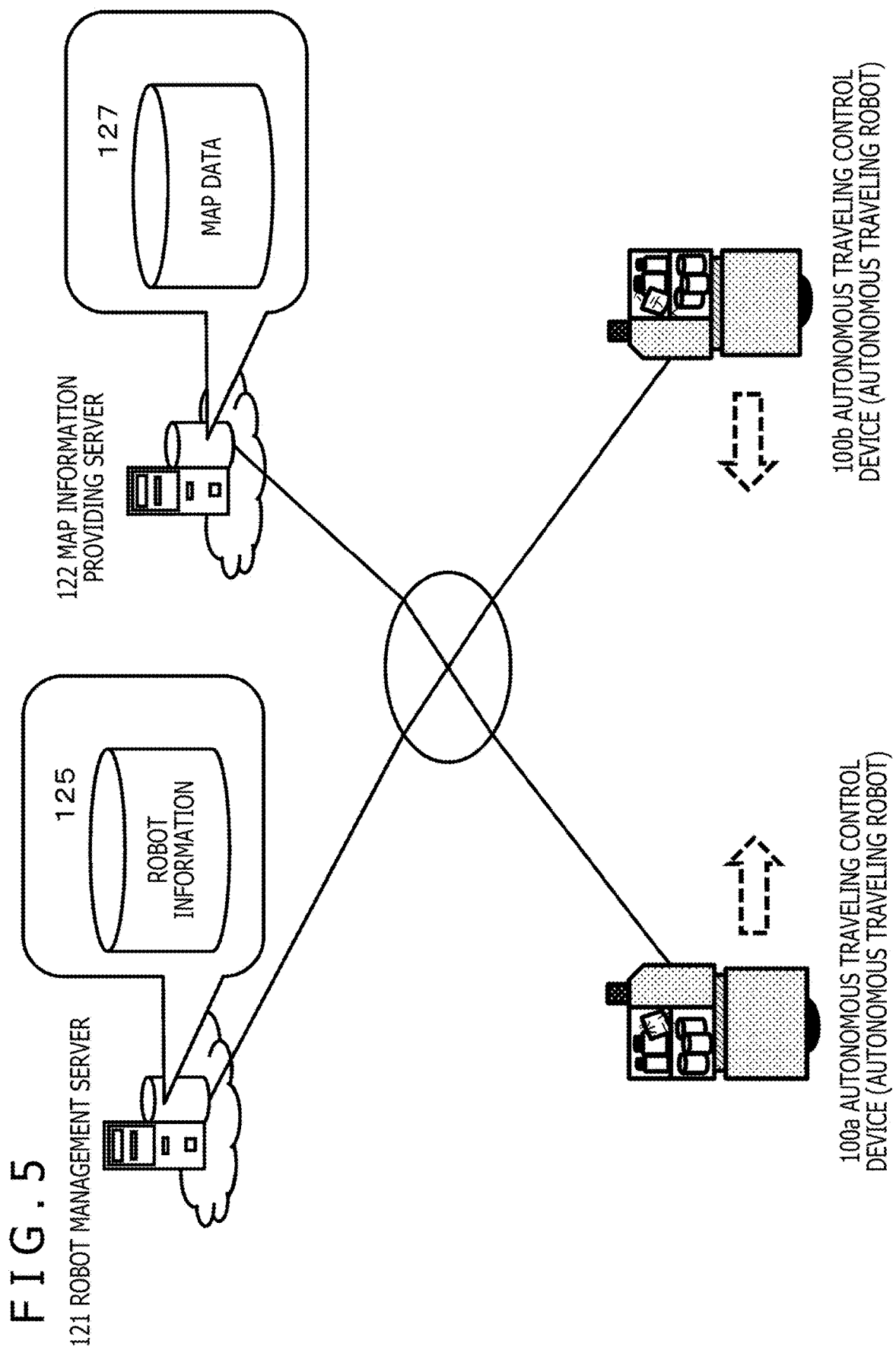
FIG. 5 is a diagram explaining a configuration example of an autonomous traveling control system.

FIG. 5 depicts autonomous traveling control devices (autonomous traveling robots) 100a and 100b, a robot management server 121, and a map information providing server 122. These constituent elements are configured to communicate with one another via a network.

The robot management server 121 executes a process performed by the traveling path determination unit 101 described above with reference to FIG. 4, i.e., a process for determining a safe traveling path which avoids a dangerous region, to generate traveling path data.

The robot management server 121 determines a traveling path for each of the autonomous traveling control devices (autonomous traveling robots) 100a and 100b communicable with the robot management server 121 via the network, and transmits traveling path data constituted by the determined route to each of the autonomous traveling control devices (autonomous traveling robots) 100*a* and 100*b*.

Each of the autonomous traveling control devices (autonomous traveling robots) 100*a* and 100*b* executes a traveling process according to the traveling path data received from the robot management server 121.

Note that the robot management server 121 retains robot information 125. The robot information 125 includes recording of identification information associated with the respective autonomous traveling control devices (autonomous traveling robots) 100*a* and 100*b*, current position information, information indicating the determined traveling routes, and the like.

The map information providing server 122 retains map data 127 and provides the map data 127 for the robot management server 121 and the autonomous traveling control devices (autonomous traveling robots) 100*a* and 100*b*.

Incidentally, while the robot management server 121 and the map information providing server 122 are presented as separate servers in the network configuration depicted in FIG. 5, such a configuration which unifies these servers into one server may be adopted. Moreover, each of the robot management server 121 and the map information providing server 122 may be constituted by a plurality of servers.

[3. Process Executed by Autonomous Traveling Control Device of Present Disclosure]

Described next will be a process executed by the autonomous traveling control device of the present disclosure.

Note that the traveling route determination process may be executed by an autonomous traveling control device such as an autonomous traveling robot, or may be executed by an external server as described with reference to FIGS. 4 and 5.

Described hereinafter will be an embodiment as a typical example where an autonomous traveling control device such as an autonomous traveling robot performs a traveling route determination process.

Figure 6:
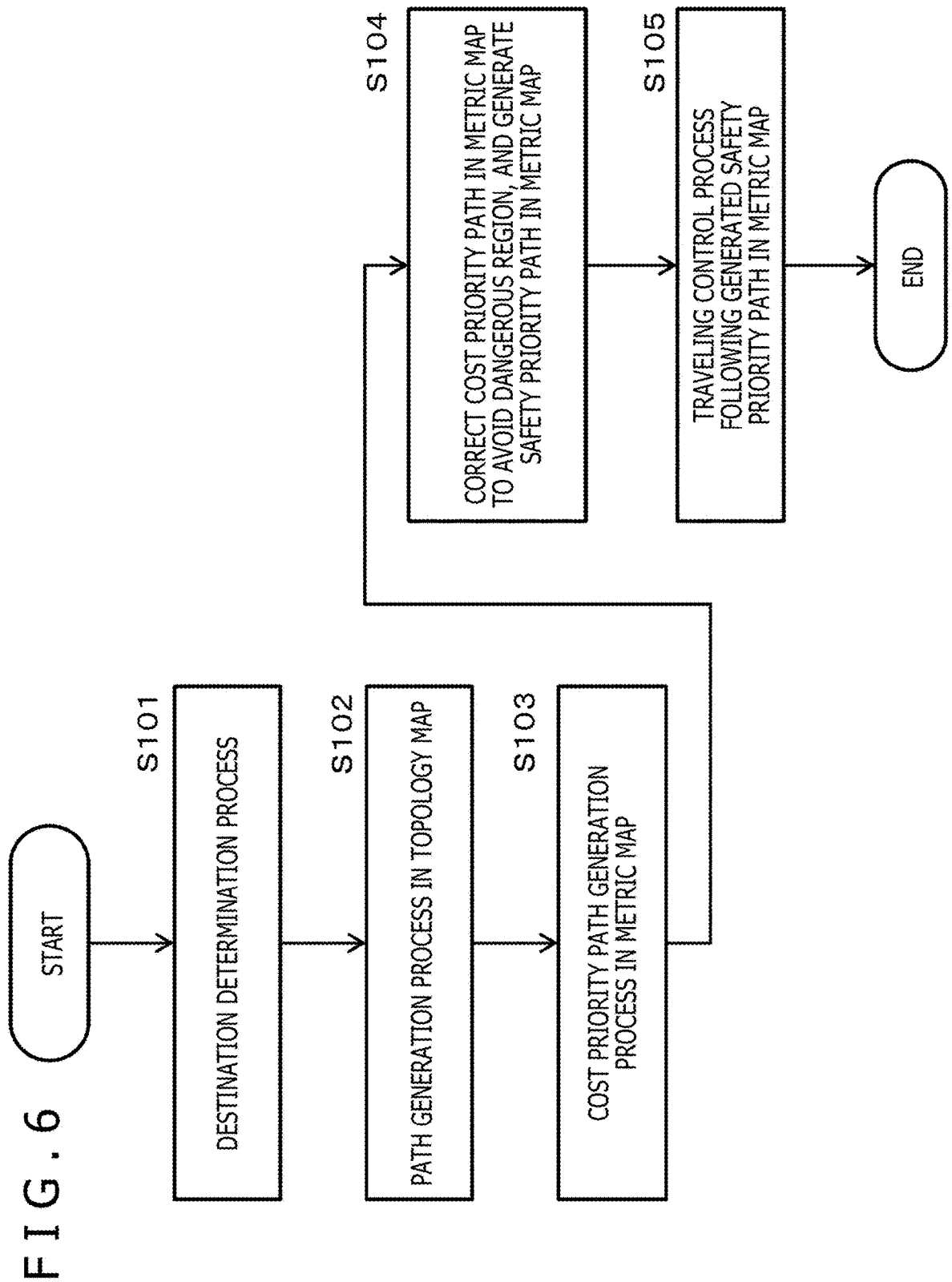
FIG. 6 is a diagram presenting a flowchart for explaining a sequence of a process executed by the autonomous traveling control device of the present disclosure.

FIG. 6 is a diagram presenting a flowchart which explains a sequence of a process executed by the autonomous traveling control device 100 of the present disclosure.

Note that the process performed according to the flowchart presented in FIG. 6 can be executed by a control unit (data processing unit) of the autonomous traveling control device 100 such as an autonomous traveling robot, specifically, the traveling path determination unit 101 or the traveling control unit 102 described with reference to FIG. 4 under a program stored in the storage unit of the autonomous traveling control device 100, for example. For example, this process can be performed as a program execution process achieved by a processor having a program execution function, such as a CPU.

Note that a part of steps in the flow presented in FIG. 6 can be also executed as a process performed by a server communicable with the autonomous traveling control device 100.

Processing of the respective steps in the flow presented in FIG. 6 will be hereinafter described.

(Step S101)

Processing in steps S101 to S104 is processing executed by the traveling path determination unit 101 included in the configuration depicted in FIG. 4.

In step S101, the traveling path determination unit 101 of the autonomous traveling control device 100 initially executes a determination process for determining a destination.

This destination determining process in step S101 can be executed by an input process input from a user via an input unit of the autonomous traveling control device 100, for example. Alternatively, this process can be a process causing a communication unit of the autonomous traveling control device 100 to receive destination setting information transmitted from an external device or an external server. This process is therefore executable in various processing modes.

(Step S102)

In step S102, a path to the destination determined in step S101 in a topology map is subsequently generated.

The topology map is map information constituted by typical spots which are nodes (e.g., intersections), and edges as connection lines between the nodes.

Figure 7:
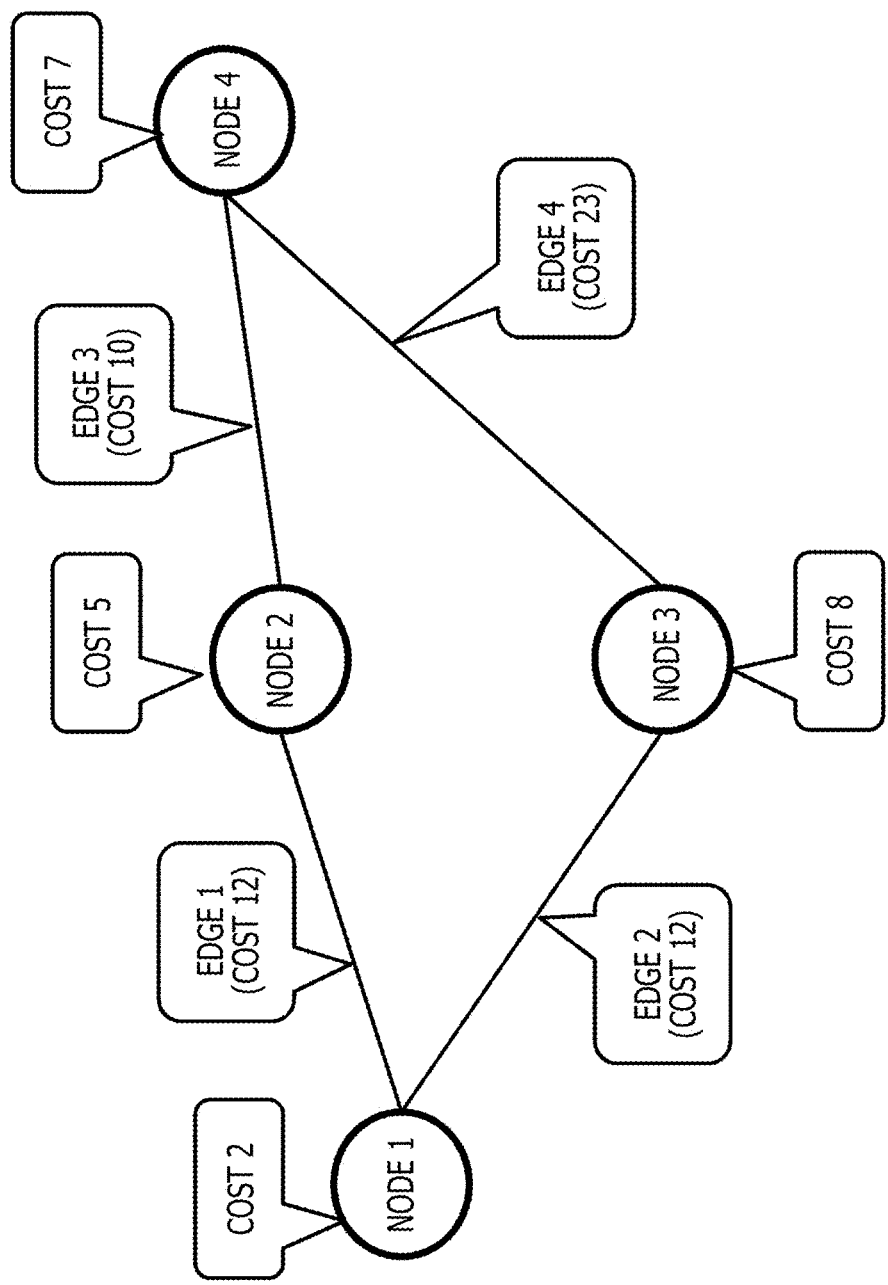
FIG. 7 is a diagram explaining a topology map.

FIG. 7 depicts an example of the topology map.

In step S102, a traveling path constituted by these nodes and edges in the topology map, i.e., a path from a current location to the destination is generated.

Specifically, a path setting which edges are to be followed, and which nodes are to be passed through in a range from the node closest to the current location to the node closest to the destination is generated.

Note that acquisition of an edge configuration between the nodes is only required to determine "whether or not the range extending from the current location to the destination is travelable." Information associated with coordinates of the nodes and distances between the nodes (edge lengths) is unnecessary to determine "whether or not the range extending from the current location to the destination is travelable."

Note that a plurality of "travelable routes" is settable from the current location to the destination in many cases. In other words, a plurality of routes is settable on an assumption that whatever detour is allowed.

Typically, a traveling route determined using the topology map is a shortest route. A concept of "cost" is set for each of nodes and edges of the topology map to determine this shortest route. For selecting the shortest route, it is sufficient if a route producing the smallest total sum of the costs of the nodes and the edges is designated as a finally determined route.

Note that various methods are adoptable to set the costs. A simplest example is a method which sets the costs on the basis of distances and inclination information. Moreover, additional elements, such as an element which increases the cost given to a spot to be avoided as much as possible, may be used.

In step S102, the traveling path determination unit 101 depicted in FIG. 4 determines one path allowing an earliest arrival at the destination from the current location with reference to the costs in the topology map, and generates path information constituted by the determined route.

(Step S103)

In step S103, the traveling path determination unit 101 subsequently determines a cost priority path in the metric map.

The traveling path determination unit 101 determines a cost priority path in the metric map while reflecting the path determined in the topology map and generated in step S102, i.e., the path determined on the basis of the cost, in the metric map.

For example, the traveling path determination unit 101 determines the cost priority path producing the smallest cost and corresponding to the shortest path.

The metric map is a map reflecting actual distances and sizes. Note that the metric map has various formats according to use purposes.

For example, the metric map used in a case of a wheeled mobile body is generated by defining a path which indicates a manner of traveling in a travelable region using a two-dimensional map (e.g., sketch or bird's eye view) which has information indicating whether or not the region is travelable.

Note that nodes and edges in the topology map are associated with positions, and paths such as roads and passages in the metric map.

Coordinates are unnecessary for each of the nodes in the topology map. Actual positions (coordinates) of the respective nodes are acquirable on the basis of positions in the metric map corresponding to the positions of the nodes in the topology map.

Note that the edges in the topology map may be data constituted by only costs and connection relations between the nodes. Each of the edges is associated with a path in the metric map. A certain edge is a narrow and curved road in the metric map, while another edge corresponds to a wide straight road. These edges are similarly represented as "edges" in the topology map. However, costs are set such that a higher cost is given to the narrow and curved road, for example.

Various methods are adoptable as a path generation method in the metric map. For example, in a case of a metric map used by an autonomous driving vehicle, a plurality of vehicle travelable paths is created in the metric map. For example, travelable paths such as rails are generated.

Moreover, edges in the topology map are set in association with the corresponding paths in the metric map where the respective paths have been set.

An example of a path determination process for determining a path in the metric map will be described with reference to FIG. 8.

Figure 8:
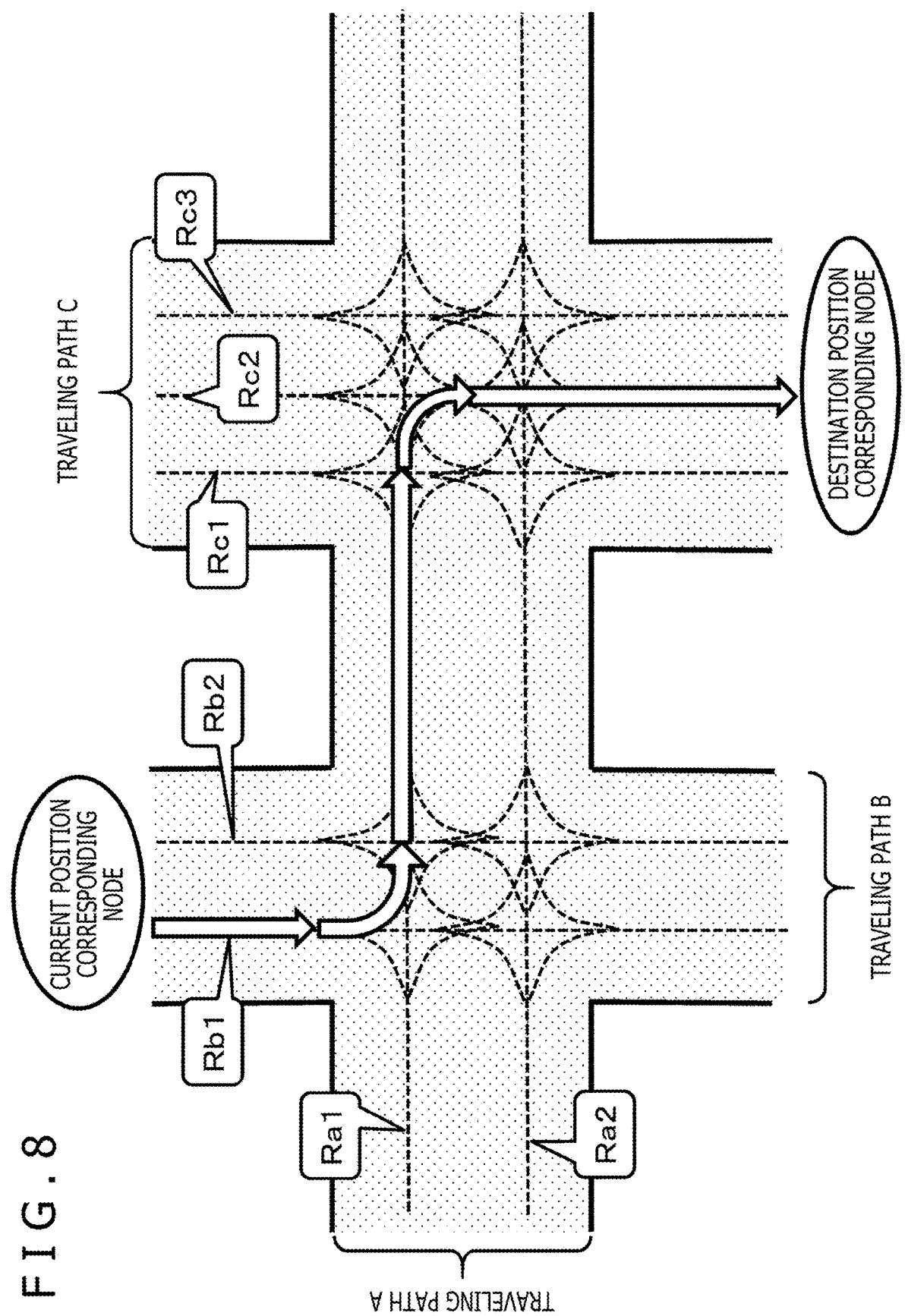
FIG. 8 is a diagram explaining a specific example of a metric map.

FIG. 8 depicts an example of the metric map. The metric map depicted in FIG. 8 includes a traveling path A, a traveling path B, and a traveling path C. Each of the traveling paths includes routes each indicated by a dotted line, as routes where the autonomous traveling control device 100 such as an autonomous traveling robot is travelable.

The traveling path A includes a route Ra1 and a route Ra2 as two travelable routes.

The traveling path B includes a route Rb1 and a route Rb2 as two travelable routes.

The traveling path C includes a route Rc1, a route Rc2, and a route Rc3 as three travelable routes.

Described will be a processing example performed in a case of determining a traveling route from a current location corresponding to a node to a destination corresponding to a node in the topology map, for example.

In a case of traveling from the current location corresponding to the node to the destination corresponding to the node, the traveling path B, the traveling path A, and the traveling path C are used for traveling.

The route Rb1 or the route Rb2 is selectable from the traveling path B.

The route Ra1 or the route Ra2 is selectable from the traveling path A.

The route Rc1, the route Rc2, or the route Rc3 is selectable from the traveling path C.

Each of these routes is associated with the corresponding edge in the topology map. An intersection portion of each of the traveling paths is associated with the corresponding node of the topology map. As described above, a cost is set for each of the edges and nodes in the topology map. In step S102, the route producing the smallest total cost is selected in the topology map.

In step S103, a route (traveling path) corresponding to the route producing the smallest total cost in the topology map is selected from the metric map.

For example, a traveling path constituted by following routes depicted in FIG. 8, i.e., the route Rb1 of the traveling path B, the route Ra2 of the traveling path A, and the route Rc2 of the traveling path C, is determined as a cost priority path in the metric map. Specifically, for example, the path having the shortest path is determined as the cost priority path producing the smallest cost.

(Step S104)

In step S104, the traveling path determination unit 101 subsequently performs a correction process for correcting the cost priority path generated in the metric map in step S103 into a path avoiding passage through or approach to a dangerous region to generate a safety priority path in the metric map.

The cost priority path generated in metric map in step S103 is a cost priority path generated without consideration of avoidance from a dangerous region in the path, i.e., a dangerous region such as the junction 31 as described above with reference to FIG. 3.

In step S104, position information associated with the dangerous region in this cost priority path is acquired, and the path is corrected into a path avoiding passage through or approach to the dangerous region in the cost priority path to generate a safety priority path.

A specific processing example of step S104 will be described with reference to FIG. 9.

Figure 9:
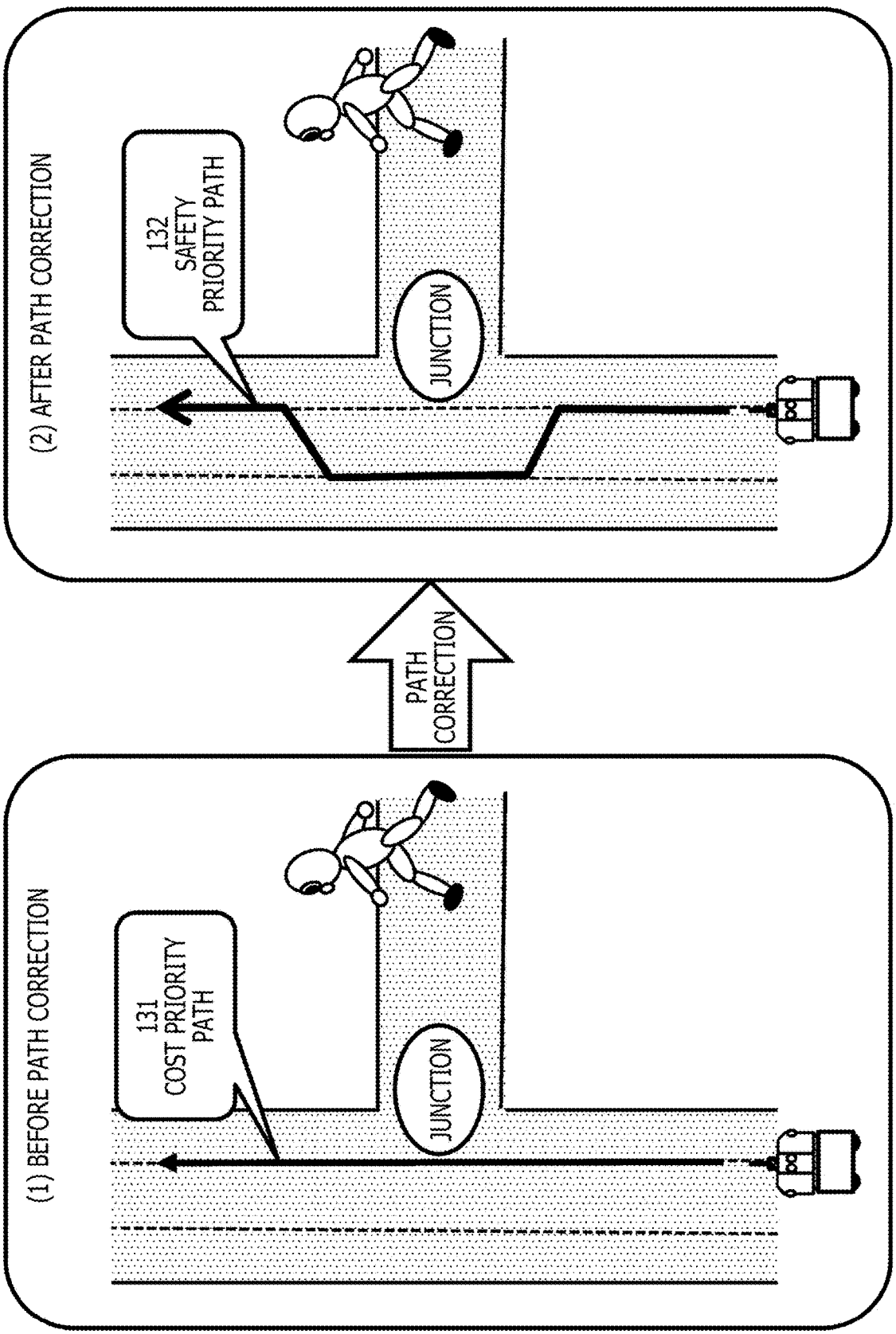
FIG. 9 is a diagram explaining a specific example of a generation process for generating a safety priority path.

FIG. 9 depicts following two path setting examples.

(1) Before path correction (2) After path correction

A cost priority path 131 depicted in FIG. 9(1) before path correction is a path generated such that the path in the topology map is reflected in the metric map in step S103.

This path is a path producing the smallest cost.

However, the cost priority path 131 is a path passing through a position extremely close to a junction corresponding to a dangerous region as depicted in FIG. 9(1). Accordingly, traveling using this path may cause a collision with a mobile object such as a human or another vehicle at the junction.

In step S104, information indicating a dangerous region such as the foregoing junction is acquired from the map data 111, and a path correction is executed on the basis of the acquired dangerous region information. Specifically, in a case where a dangerous region is present in the cost priority path, or at a position close to the cost priority path, the path is corrected into a path away from the dangerous region.

Note that the distance between the cost priority path corresponding to a path correction target and the dangerous region is specified beforehand.

For example, a path correction is made in a case where the distance between the cost priority path and the dangerous region is equal to or shorter than a threshold specified beforehand.

The traveling path determination unit 101 generates a safety priority path 132 depicted in FIG. 9(2), for example, by the path correction made in step S104.

The safety priority path 132 depicted in FIG. 9(2) is a path which bypasses the dangerous region (junction) in a direction away from the junction of a T-junction corresponding to the dangerous region.

The autonomous traveling robot or the like travels along the safety priority path 132 which bypasses the dangerous region (junction) in a direction away from the dangerous region (junction). In this manner, a possibility of a collision or a contact with another mobile object at the junction can be reduced.

As described above, the traveling path determination unit 101 in step S104 performs a correction process for correcting the cost priority path generated in the metric map in step S103 into a path avoiding passage through or approach to a dangerous region to generate a safety priority path in the metric map.

In other words, the path is corrected in such a manner as to avoid the dangerous region in the cost priority path to generate a safety priority path.

(Step S105)

Subsequent step S106 is processing executed by the traveling control unit 102 depicted in FIG. 4.

In step S105, the traveling control unit 102 executes traveling control causing the autonomous traveling control device (autonomous traveling robot) 100 to travel along the safety priority path determined by the traveling path determination unit 101 in the metric map in step S104.

This traveling control allows the autonomous traveling control device (autonomous traveling robot) 100 to achieve safe traveling along the path avoiding the dangerous region such as a junction.

As described above, the autonomous traveling control device 100 of the present disclosure initially determines a minimum cost path from a current location to a destination in the topology map, and then generates a cost priority path in the metric map such that the determined minimum cost path is reflected in the metric map.

Moreover, the autonomous traveling control device 100 generates a safety priority path by correcting the cost priority path into a path away from a dangerous region in a case where the dangerous region is located in the cost priority path in the metric map, or at a position close to the cost priority path, then executes traveling control to allow the autonomous traveling control device (autonomous traveling robot) 100 to travel along the safety priority path.

Note that various types of map information are necessary in a case of execution of the process following the flow presented in FIG. 6.

Data used at the time of execution of the process presented in FIG. 6 will be described with reference to FIG. 10.

Figure 10:
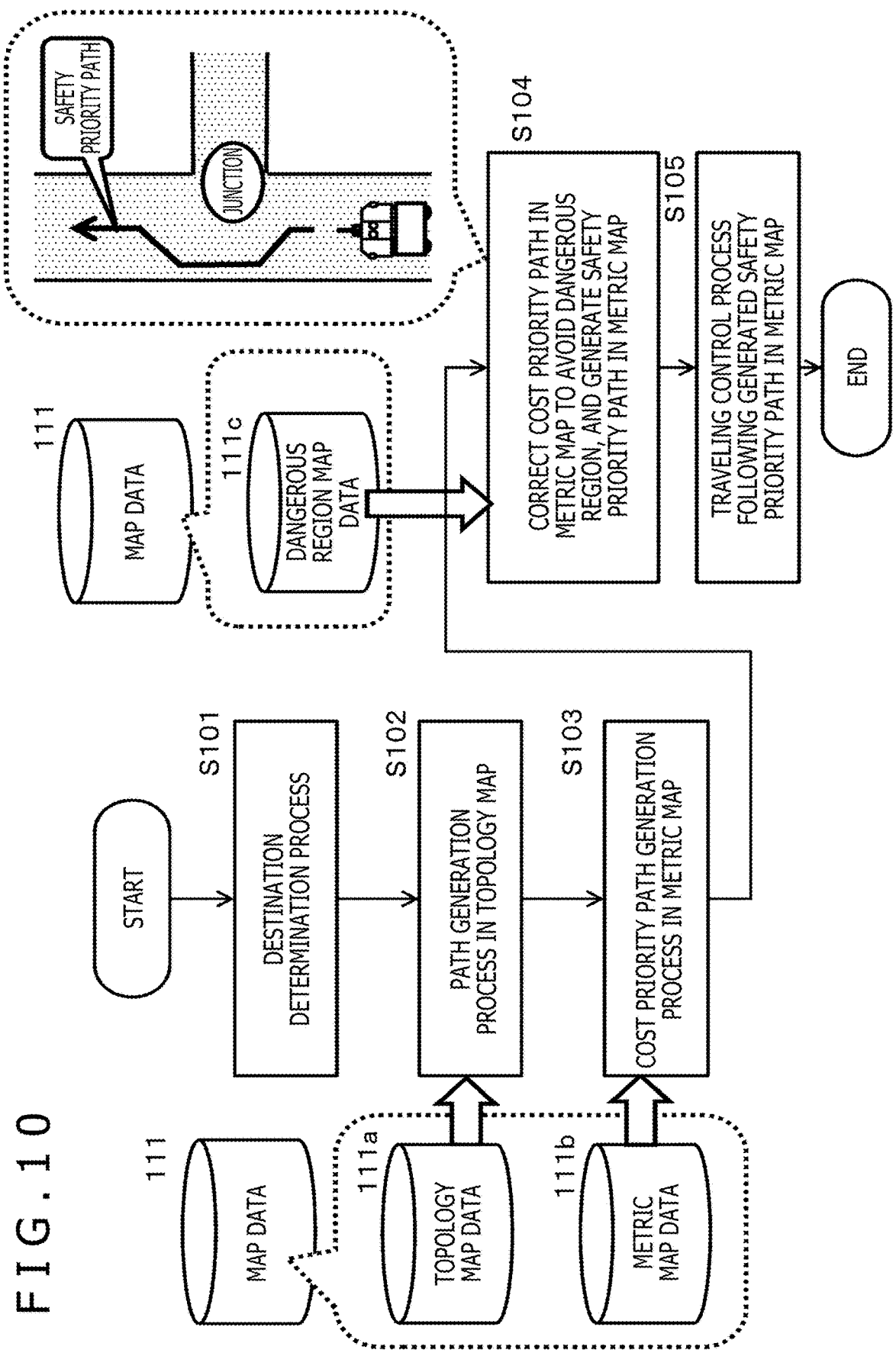
FIG. 10 is a diagram explaining a sequence of a process executed by the autonomous traveling control device of the present disclosure, and used data.

A flowchart presented in FIG. 10 is a flow similar to the flow presented in FIG. 6. FIG. 10 is a chart further including information used for processing in respective steps in the flow.

In step S102, the traveling path determination unit 101 included in the configuration depicted in FIG. 4 generates a traveling path in the topology map constituted by nodes and edges, i.e., a cost priority path from a current location to a destination as described above.

In this processing, topology map data 111*a* contained in the map data 111 is used.

As described above, the topology map is map information constituted by typical spots which are nodes (e.g., intersections), and edges as connection lines between nodes, and is map data where cost information is set for each of the nodes and the edges. The topology map is constituted by the data described above with reference to FIG. 7.

In step S102, the cost priority path from the current location to the destination is generated using the topology map data 111*a* contained in the map data 111.

In subsequent step S103, the traveling path determination unit 101 generates a cost priority path in the metric map as described above.

Specifically, the traveling path determination unit 101 determines a cost priority path in the metric map such that the path determined in the topology map and generated in step S102, i.e., the path determined on the basis of the cost, is reflected in the metric map.

In this processing, metric map data 111*b* contained in the map data 111 is used.

As described above, the metric map is a map reflecting actual distances and sizes. The metric map is map data where travelable paths are set as described above with reference to FIG. 8.

In step S103, the cost priority path from the current location to the destination is generated using the metric map data 111*b* contained in the map data 111.

In subsequent step S104, the traveling path determination unit 101 generates a safety priority path as described above.

Specifically, the traveling path determination unit 101 corrects the cost priority path generated by the traveling path determination unit 101 in metric map in step S103 into the safety priority path.

In this processing, dangerous region map data 111*c* contained in the map data 111 is used.

The dangerous region map data 111*c* is map data where position information associated with a dangerous region or a dangerous region representative point is recorded in the metric map reflecting actual distances and sizes.

In step S104, the safety priority path is generated using the dangerous region map data 111*c* contained in the map data 111.

Note that the dangerous region map data 111*c* may be generated beforehand, or may be generated on the basis of a result of detection of a dangerous region contained in a traveling schedule of the autonomous traveling control device 100, i.e., the cost priority path from the current location to the destination in the metric map, for example, after detection of the traveling schedule.

This processing is executed by the traveling path determination unit 101 of the autonomous traveling control device 100. Alternatively, this processing may be configured to be executed by the robot management server 121 or the map information providing server 122.

In this manner, various types of map data are used until generation of the safety priority path.

Note that these map data are acquirable from a dynamic map provided by the map information providing server 122, for example.

The dynamic map (DM) will be described with reference to FIG. 11.

Figure 11:
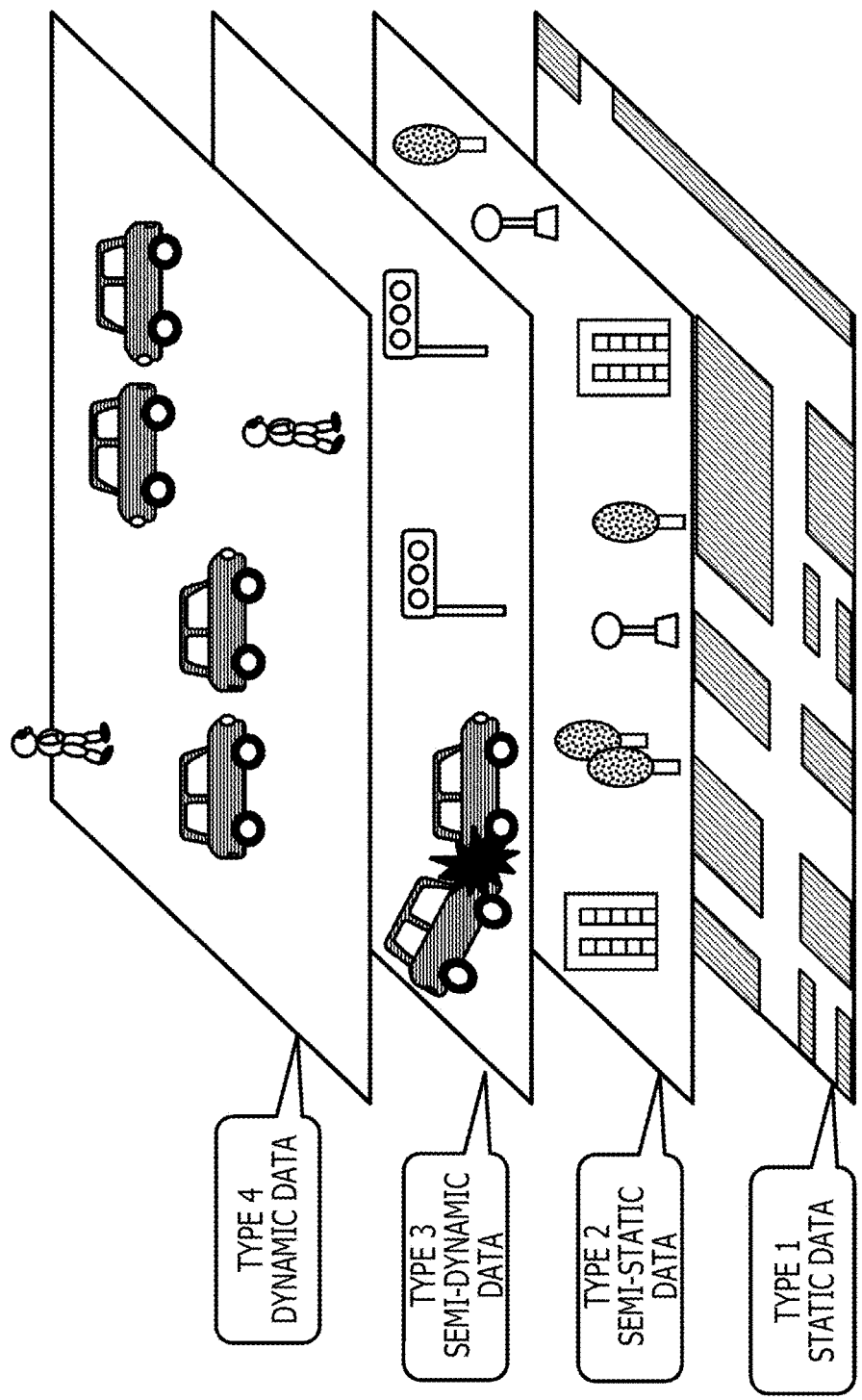
FIG. 11 is a diagram explaining a dynamic map (DM).

As depicted in FIG. 11, the dynamic map (DM) is constituted by information groups in a plurality of types of hierarchized layers. Specifically, the dynamic map (DM) is constituted by following four types of information.

Type 1=static data
Type 2=semi-static data
Type 3=semi-dynamic data
Type 4=dynamic data Type 1=static data is constituted by data such as map information generated on the basis of a map of the Geospatial Information Authority of Japan updated for every medium to long term, for example.

Type 2=semi-static data is constituted by data not considerably changing in a short term, but changing in a long term, such as an architectural structure like a building, a tree, and a traffic sign, for example.

Type 3=semi-dynamic data is constituted by data which may change for every fixed time unit, such as a traffic light, a traffic jam, and an accident.

Type 4=dynamic data is constituted by data sequentially changeable, such as information associated with comings and goings of a vehicle, a human, or the like.

The dynamic map (DM) constituted by these data is transmitted from the map information providing server 122 to the respective autonomous traveling control devices 100 and the robot management server 121, for example. The respective autonomous traveling control devices 100 and the robot management server 121 are thus capable of analyzing the dynamic map (DM), and using the dynamic map (DM) for autonomous driving control such as settings of traveling paths, and control of traveling speeds and lanes.

Note that the map information providing server 122 continuously executes a dynamic map (DM) updating process on the basis of latest information. The respective autonomous traveling control devices 100 and the robot management server 121 acquire and use latest information from the map information providing server 122 at the time of use of the DM.

[4. Specific Example of Generation Process of Safety Priority Path]

Described next will be a specific example of a generation process for generating a safety priority path generated by the traveling path determination unit 101 of the autonomous traveling control device 100 depicted in FIG. 4.

Figure 12:
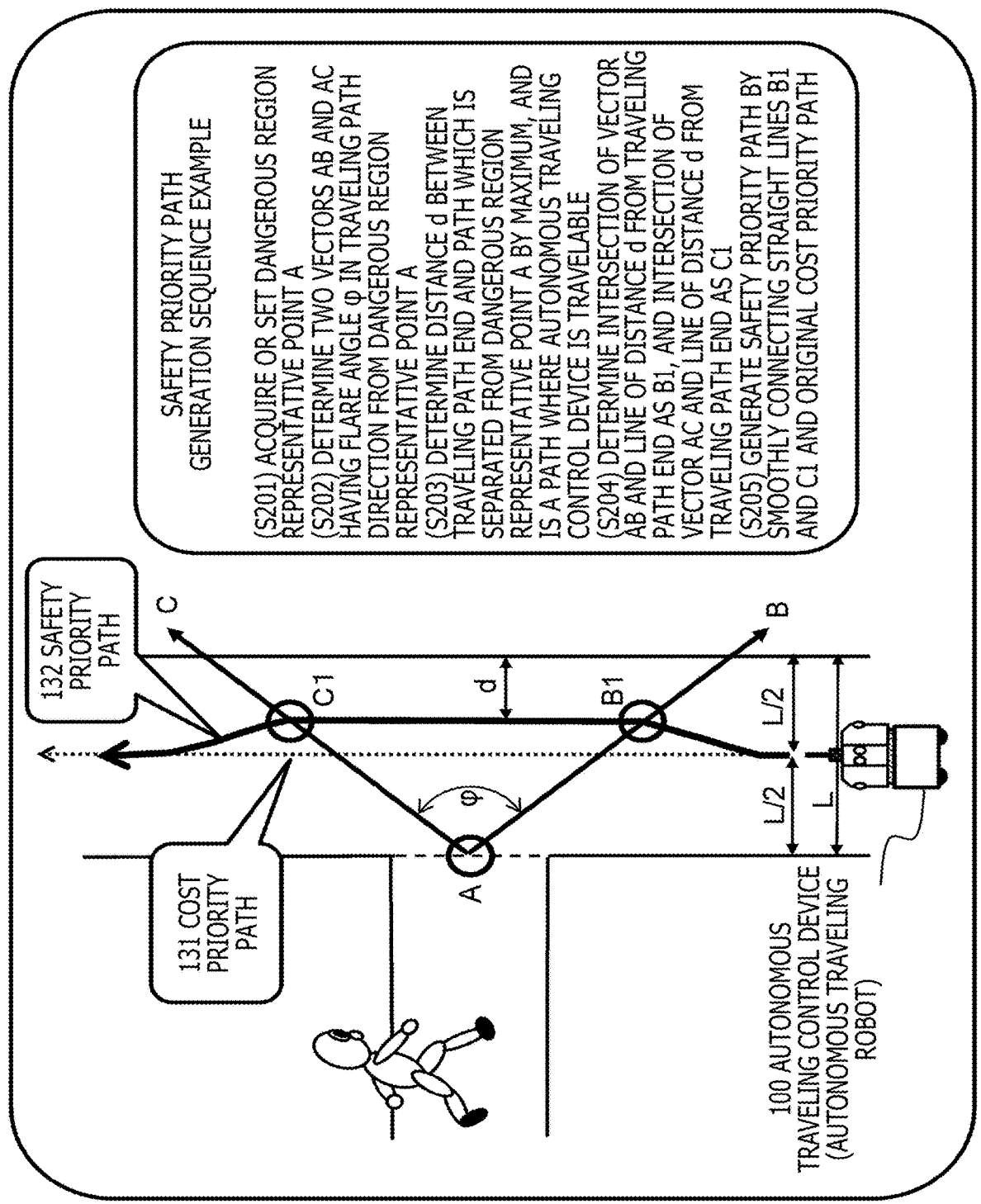
FIG. 12 is a diagram explaining a specific example of a generation process for generating a safety priority path.

FIG. 12 is a diagram explaining a specific example of the generation process for generating the safety priority path.

As depicted in the figure, it is assumed that the autonomous traveling control device 100 travels on a traveling path having a width L.

A T-junction is present in the middle of the traveling path. There is a possibility that a human, a vehicle, or the like runs out from the left of the T-junction.

It is assumed that the cost priority path 131 has been set according to processing in step S103 in FIG. 6 described above.

The traveling path determination unit 101 performs a correction process for correcting the cost priority path 131 already set into a path avoiding passage through or approach to a dangerous region to generate the safety priority path 132.

A generation sequence for generating the safety priority path 132 will be described.

For example, the generation process for generating the safety priority path 132 is executed according to steps S01 to S05 presented in the right part of FIG. 12.

These processing steps will be described.
(Step S201)

Acquisition or setting of dangerous region representative point A

In step S201, the traveling path determination unit 101 initially executes an acquisition or setting process for acquiring or setting a dangerous region representative point A. Position information associated with this dangerous region representative point is acquirable from the dangerous region map data 111c contained in the map data 111 described above with reference to FIG. 10.

The dangerous region representative point A is determined according to a mode of the dangerous region, such as a central position of the dangerous region, and a central point of an intersection position of two traveling paths.

In addition, as described above, the dangerous region map data 111c may be generated beforehand, or may be generated on the basis of a result of detection of a dangerous region contained in a traveling schedule of the autonomous traveling control device 100, i.e., the cost priority path from the current location to the destination in the metric map, for example, after determination of the traveling schedule.

In this case, the traveling path determination unit 101 performs a generation process for generating the dangerous region map data 111c in step S201, and then performs a setting process for setting the dangerous region representative point A for each of dangerous regions contained in the generated dangerous region map data 111c.

The dangerous region representative point A is set in accordance with an algorithm specified beforehand, such as a central position of the dangerous region, and a center point of an intersection position of two traveling paths.
(Step S202)

In step S202, the traveling path determination unit 101 subsequently determines two vectors AB and AC forming a flare angle ϕ expanding in a traveling direction of the autonomous traveling control device 100 from the dangerous region representative point A.
(Step S203)

In step S203, the traveling path determination unit 101 subsequently calculates a distance d between a traveling path end and a path separated from the dangerous region representative point A by a maximum length, and travelable for the autonomous traveling control device 100.

The path separated from the dangerous region representative point A by the maximum length corresponds to a path indicated by a line of B1 to C1.

The distance d needs to be determined in such a manner as not to protrude from the traveling path having a width R.

For example, assuming that the autonomous traveling control device 100 has a width W, the distance d is determined such that a following formula is met.

$$d \geq (W/2)$$

For example, it is preferable that the distance d is determined such that a following formula is met in a state where a predetermined margin a has been set.

$$d = (W/2) + \alpha$$

Various other types of modes are adoptable as the mode of the determination process for determining the distance d from the traveling path end. For example, a configuration for determining the distance d such that a following formula is met on the basis of the road width L.

$$d < (L/2)$$

Moreover, in a case where an attribute of a mobile object which may run out into the traveling path of the autonomous traveling control device 100, such as an attribute of another mobile device, a vehicle, a human, and a child is acquirable, for example, the separation distance from the dangerous region representative point A to the safety priority path may be controlled in such a manner as to be changeable according to the attribute of the mobile object.

For example, in a case where the mobile object which may run out into the traveling path of the autonomous traveling control device 100 is highly likely to be a child, the separation distance from the dangerous region representative point A to the safety priority path is made longer.
(Step S204)

In step S204, the traveling path determination unit 101 subsequently determines an intersection of the vector AB and a line of the distance d from the traveling path end as B1, and that an intersection of the vector AC and the line of the distance d from the traveling path end as C1.

In this manner, each of the point B1 on the vector AB, and the point C1 on the vector AC is determined as depicted in the figure.

(Step S205)

In step S205, the traveling path determination unit 101 finally generates a safety priority path by smoothly connecting a straight line B1-C1 and the original cost priority path.

In addition, as described above, the traveling path determination unit 101 in step S202 executes a process for determining the two vectors AB and AC forming the flare angle ϕ expanding in the traveling direction of the autonomous traveling control device 100 from the dangerous region representative point A.

The angle ϕ formed by the two vectors AB and AC at this time may be set using a value specified beforehand, or may be set so as to be changeable according to a danger level of each dangerous region.

Note that this angle data may be recorded in the map data, i.e., the dangerous region map data described with reference to FIG. 10, in association with the dangerous region.

For example, the angle ϕ is set to a large angle in a dangerous region where a child is highly likely to run out.

Moreover, the setting of the angle ϕ may be changed according to the road width. For example, the angle ϕ is set to a large value in a case where the road width is small.

Furthermore, adoptable is such a configuration which calculates the angle ϕ (°) using an angle calculation formula specified beforehand according to a danger level x, the road width L, a distance y to a next dangerous region, or the like. For example, a following formula may be used.

$$\phi = 90° + x + (\alpha/L) + (\beta \times y)$$

Note that followings are assumed in the above equation.
x: danger level index value
L: road width
y: distance to next dangerous region Note that the generation sequence for generating the safety priority path in FIG. 12 is presented by way of example. Various types of processes are executed according to setting modes of the danger region and the dangerous region representative point.

Figure 13:
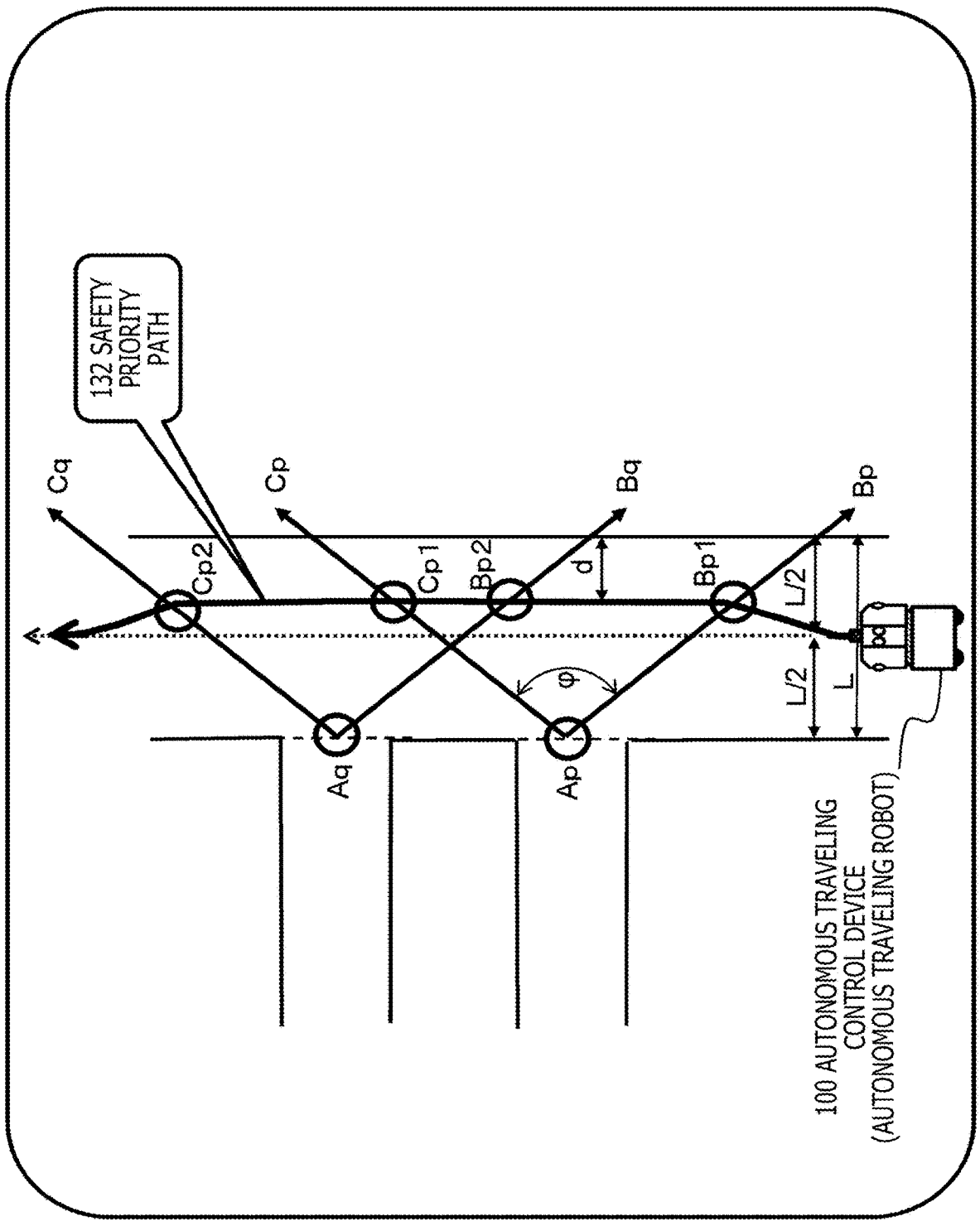
FIG. 13 is a diagram explaining a specific example of a generation process for generating a safety priority path.

FIG. 13 depicts a configuration example of a safety priority path in a case where a plurality of T-junctions is continuously disposed.

In a case where two T-junctions are continuously set in the traveling direction of the autonomous traveling control device 100 as depicted in FIG. 13, it is necessary to set a safety priority path away from dangerous region representative points Ap and Aq of the two T-junctions.

According to the example depicted in FIG. 13, formed is such a complete traveling path for linearly moving while maintaining the distance d from a right end region of the traveling path until passing through the two T-junctions without returning to the original cost priority path.

Figure 14:
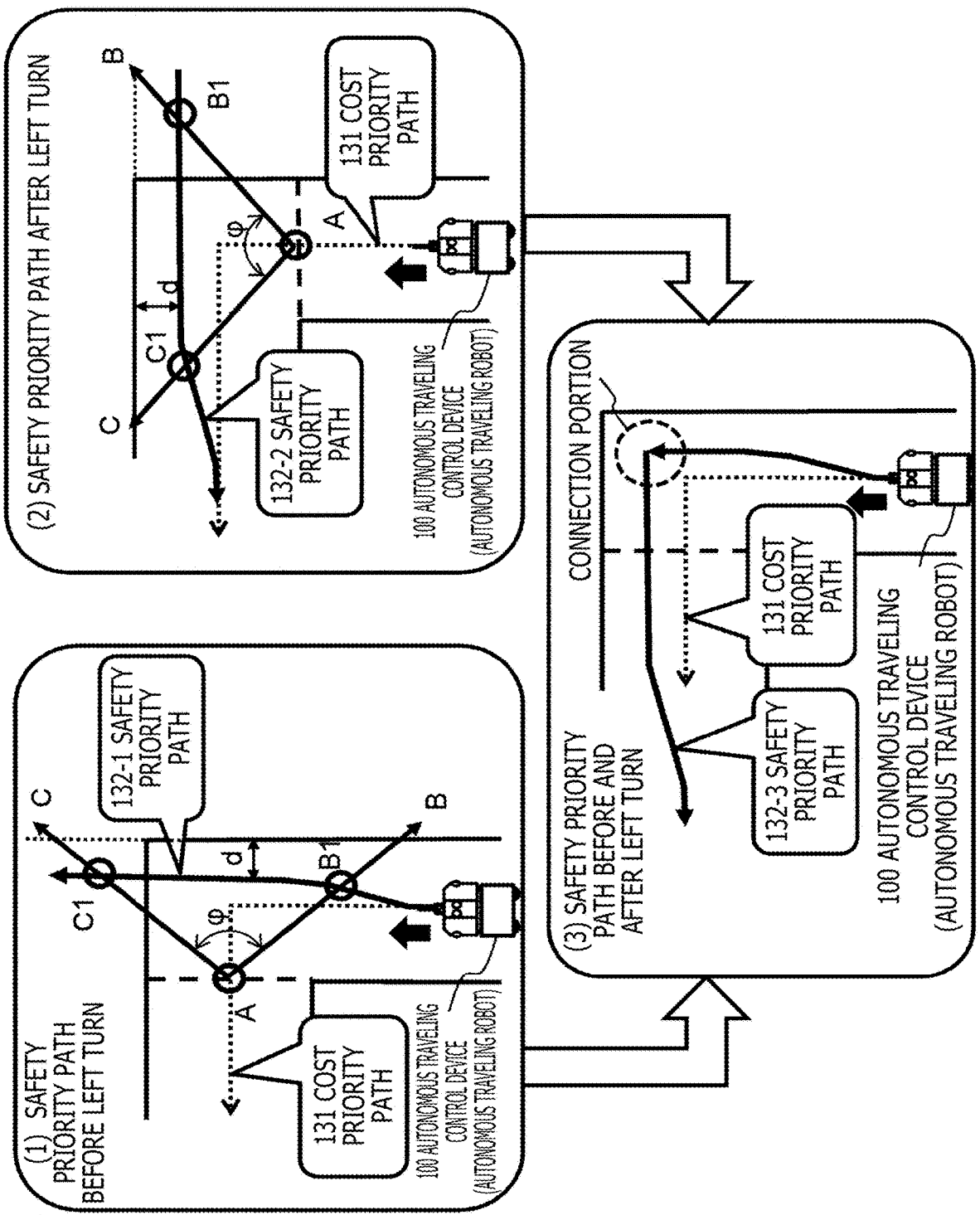
FIG. 14 is a diagram explaining a specific example of a generation process for generating a safety priority path.

Moreover, in a case of an L-junction instead of the T-junction, a safety traveling path generation process depicted in FIG. 14 is performed.

FIG. 14 depicts an example where an L-junction curved toward the left in the traveling direction of the autonomous traveling control device 100 is formed. The autonomous traveling control device (autonomous traveling robot) 100 advances in a direction indicated by a black arrow depicted in the figure, and turns to the left at the L-junction.

FIG. 14 presents following three diagrams.
(1) Safety priority path before left turn
(2) Safety priority path after left turn
(3) Safety priority path before and after left turn Initially, the traveling path determination unit 101 separately generates "(1) safety priority path before left turn" and "(2) safety priority path after left turn."

At the time of generation of "(1) safety priority path before left turn," a dangerous region representative point A is acquired from the map data, or determined on the basis of the map data in an entrance central portion of the traveling path after the left turn. Moreover, two vectors AB and AC forming a flare angle ϕ of on the traveling path side before the left turn are set. Furthermore, intersections B1 and C1 of the two vectors AB and AC and a line of a distance d from the right end surface of the traveling path before the left turn, respectively, are set.

A straight line connecting the intersections B1 and C1 is set. The intersection B1 is smoothly connected to the cost priority path 131 set beforehand to generate a safety priority path 132-1.

At the time of generation of "(2) safety priority path after left turn," a dangerous region representative point A is acquired from the map data, or determined on the basis of the map data in the entrance central portion of the traveling path before the left turn. Moreover, two vectors AB and AC forming a flare angle ϕ of on the traveling path side after the left turn are set. Furthermore, intersections B1 and C1 of the two vectors AB and AC and the line of a distance d from the right end surface of the traveling path after the left turn, respectively, are set.

A straight line connecting the intersections B1 and C1 is set. The intersection B1 is smoothly connected to the cost priority path 131 set beforehand to generate a safety priority path 132-2.

"(3) safety priority path before and after left turn" is generated by connecting the safety priority path 132-1 before the left turn and the safety priority path 132-2 after the left turn.

A safety priority path 132-3 before and after the left turn as depicted in a lower part of FIG. 14 is generated by this connection process.

The autonomous traveling control device 100 travels along the safety priority path 132-3 before and after the left turn thus generated and depicted in the lower part of FIG. 14. This traveling process can reduce a possibility of a collision with an oncoming vehicle from the traveling path after the left turn, which vehicle is difficult to detect by the sensor before the left turn.

Moreover, this traveling process can also reduce a possibility of a collision with an overtaking vehicle from the traveling path before the left turn, which vehicle is difficult to detect by the sensor after the left turn.

Note that a connection portion of the safety priority path 132-3 before and after the left turn depicted in the lower part of FIG. 14 may have a right-angled configuration as depicted in the figure, or may have a smoothly curved configuration.

[5. Setting Examples of Safety Priority Path Corresponding to Various Dangerous Regions]

Described next will be setting examples of a safety priority path corresponding to various dangerous regions.

A dangerous region is present not only in the traveling path of the autonomous traveling control device 100, but also at various other positions. Described hereinafter will be setting examples of a safety priority path corresponding to various different types of dangerous regions.

Figure 15:
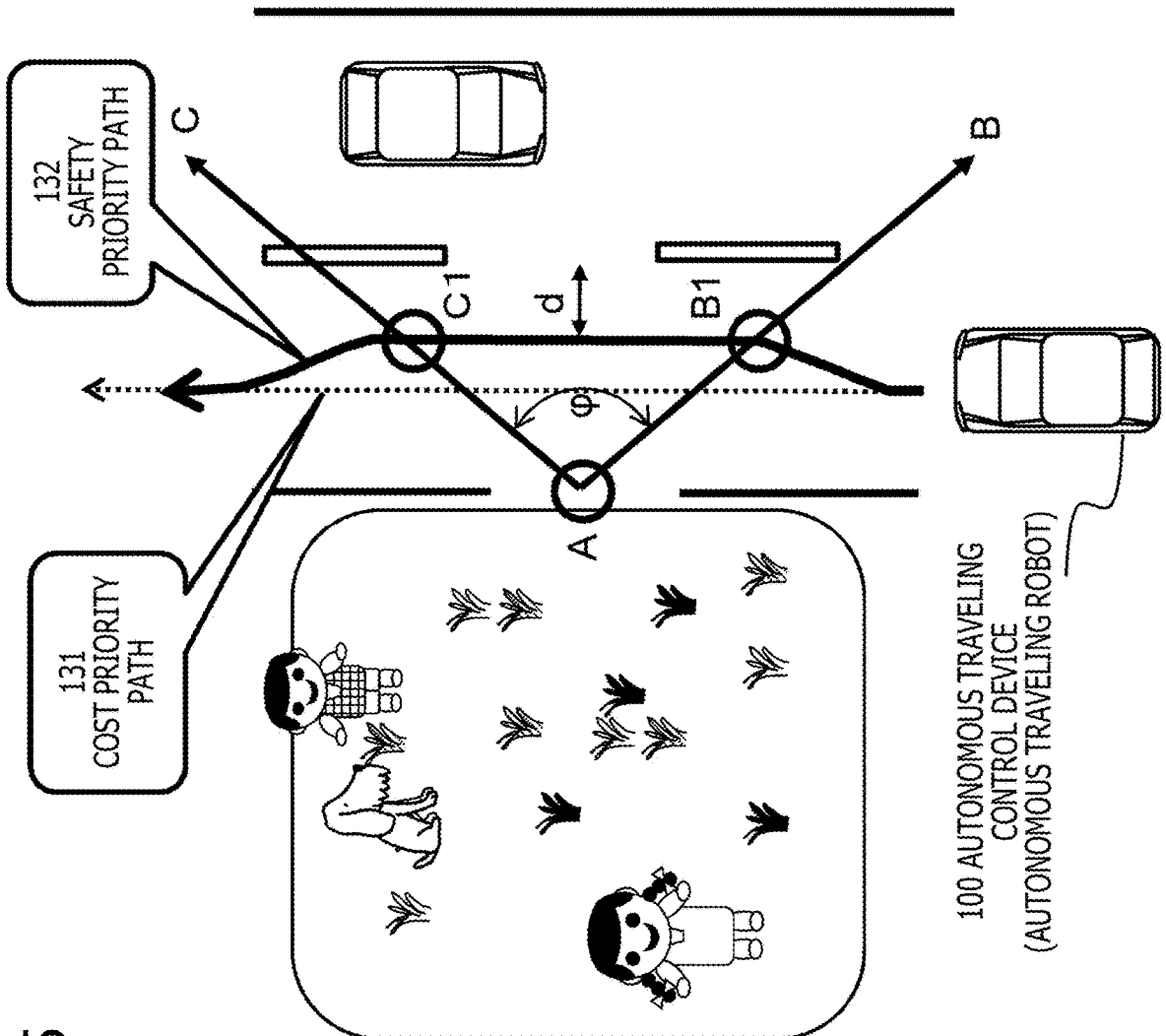
FIG. 15 is a diagram explaining a setting example of a safety priority path corresponding to various dangerous regions.

FIG. 15 is an example where a gateway of a park is designated as a dangerous region. A dangerous region representative point A is set at the gateway of the park in FIG. 15.

In addition, as described above, position information associated with the dangerous region and the dangerous region representative point A are recorded in the dangerous region map data 111c corresponding to configuration information included in the map data 111.

The dangerous region map data 111c is map data where position information associated with the dangerous region or the dangerous region representative point A is recorded in the metric map reflecting actual distances and sizes.

The traveling path determination unit 101 acquires the dangerous region representative point A in a central portion of the gateway of the park from the map data, or determines the dangerous region representative point A on the basis of the map data. Moreover, two vectors AB and AC forming a flare angle ϕ of on the traveling path side are set. Furthermore, a traveling allowable range of the traveling path, or intersections B1 and C1 of the two vectors AB and AC and a line of a distance d from a median strip in this example, respectively, are set.

A straight line connecting the intersections B1 and C1 is set. The straight line B1-C1 is smoothly connected to the cost priority path 131 set beforehand to generate the safety priority path 132.

For example, the autonomous traveling control device (autonomous driving vehicle) 100 depicted in the figure travels along the safety priority path 132 depicted in FIG. 15. This traveling control allows the autonomous driving control device (autonomous driving vehicle) 100 to achieve traveling which reduces a possibility of a collision with a child or the like running out from the park.

Figure 16:
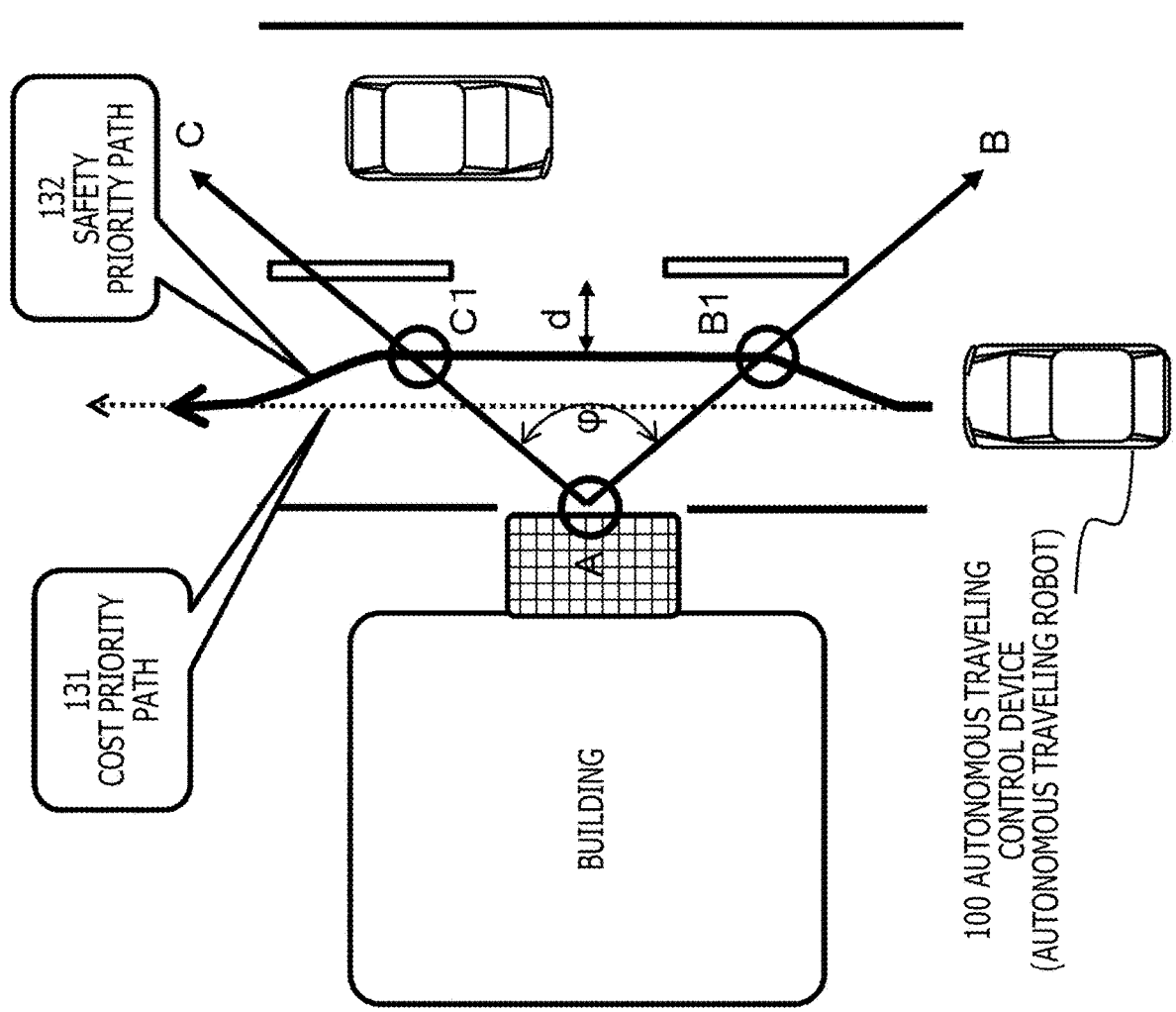
FIG. 16 is a diagram explaining a setting example of a safety priority path corresponding to various dangerous regions.

FIG. 16 is an example where a gateway of a building such as an office building is designated as a dangerous region. A dangerous region representative point A is set at the gateway of the building in FIG. 16.

The traveling path determination unit 101 acquires the dangerous region representative point A in a central portion of the gateway of the building from the map data, or determines the dangerous region representative point A on the basis of the map data. Moreover, two vectors AB and AC forming a flare angle ϕ of on the traveling path side are set. Furthermore, a traveling allowable range of the traveling path, or intersections B1 and C1 of the two vectors AB and AC and a line of a distance d from a median strip in this example, respectively, are set.

A straight line connecting the intersections B1 and C1 is set. The straight line B1-C1 is smoothly connected to the cost priority path 131 set beforehand to generate the safety priority path 132.

For example, the autonomous traveling control device (autonomous driving vehicle) 100 depicted in the figure travels along the safety priority path 132 depicted in FIG. 16. This traveling control allows the autonomous driving control device (autonomous traveling robot) 100 to achieve traveling which reduces a possibility of a collision with many persons or the like running out from the building.

Figure 17:
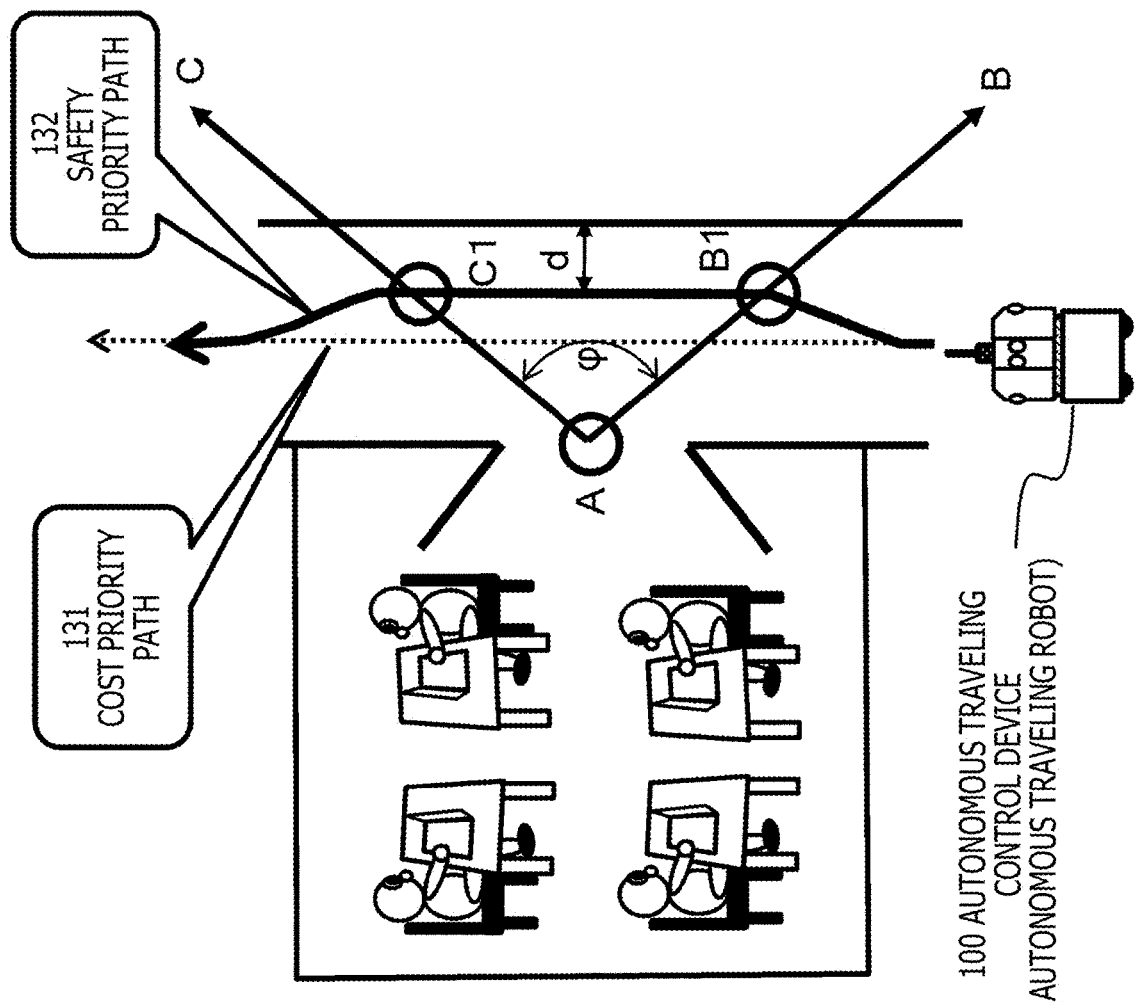
FIG. 17 is a diagram explaining a setting example of a safety priority path corresponding to various dangerous regions.

FIG. 17 depicts an example of an autonomous traveling robot autonomously traveling in an office building, for example.

The autonomous traveling control device (autonomous traveling robot) 100 travels on a corridor in the office building as a traveling path.

A dangerous region representative point A is set at a gateway of one office in the office building in FIG. 17.

The traveling path determination unit 101 acquires the dangerous region representative point A in a central portion of the gateway of the office from the map data, or determines the dangerous region representative point A on the basis of the map data. Moreover, two vectors AB and AC forming a flare angle ϕ of on the traveling path (corridor) side are set. Furthermore, a traveling allowable range of the traveling path, or intersections B1 and C1 of the two vectors AB and AC and a line of a distance d from a right side wall of the corridor in this example, respectively, are set.

A straight line connecting the intersections B1 and C1 is set. The straight line B1-C1 is smoothly connected to the cost priority path 131 set beforehand to generate the safety priority path 132.

For example, the autonomous traveling control device (autonomous traveling robot) 100 depicted in the figure travels along the safety priority path 132 depicted in FIG. 17. This traveling control allows the autonomous traveling control device (autonomous traveling robot) 100 to achieve traveling which reduces a possibility of a collision with many persons or the like running from the office to the corridor.

Note that map data associated with paths of the office building and the like is generated beforehand.

The map data 111 containing the topology map data 111a, the metric map data 111b, and the dangerous region map data 111c described above with reference to FIG. 10 is generated before execution of the process.

Adoptable is either a configuration which stores these data in the storage unit within the autonomous traveling control device (autonomous traveling robot) 100, or a configuration which retains these data in the robot management server 121 or the map information providing server 122 described with reference to FIG. 5.

Alternatively, adoptable is such a configuration which retains the respective data in another building management server and provides the respective data for the autonomous traveling control device (autonomous traveling robot) 100.

Instead, the building management server may determine a safety priority path on the basis of map data and provide the determined safety priority path for the autonomous traveling control device (autonomous traveling robot) 100.

[6. Setting Examples of Safety Priority Path Corresponding to Dangerous Region in Parking Lot]

Described next will be setting examples of a safety priority path corresponding to a dangerous region in a parking lot.

For example, many humans and vehicles go into and out of a parking lot of a shopping center or the like. Accordingly, many dangerous points are present in such a parking lot. In a case where an autonomous traveling vehicle travels in such a parking lot, a contact or the like with a human, another vehicle, or others is efficiently avoidable by setting a safety priority path avoiding passing through and approach to the above dangerous regions and allowing the autonomous traveling vehicle to travel on this path.

Described hereinafter will be a setting example of a safety priority path corresponding to a dangerous region set in a parking lot.

Figure 18:
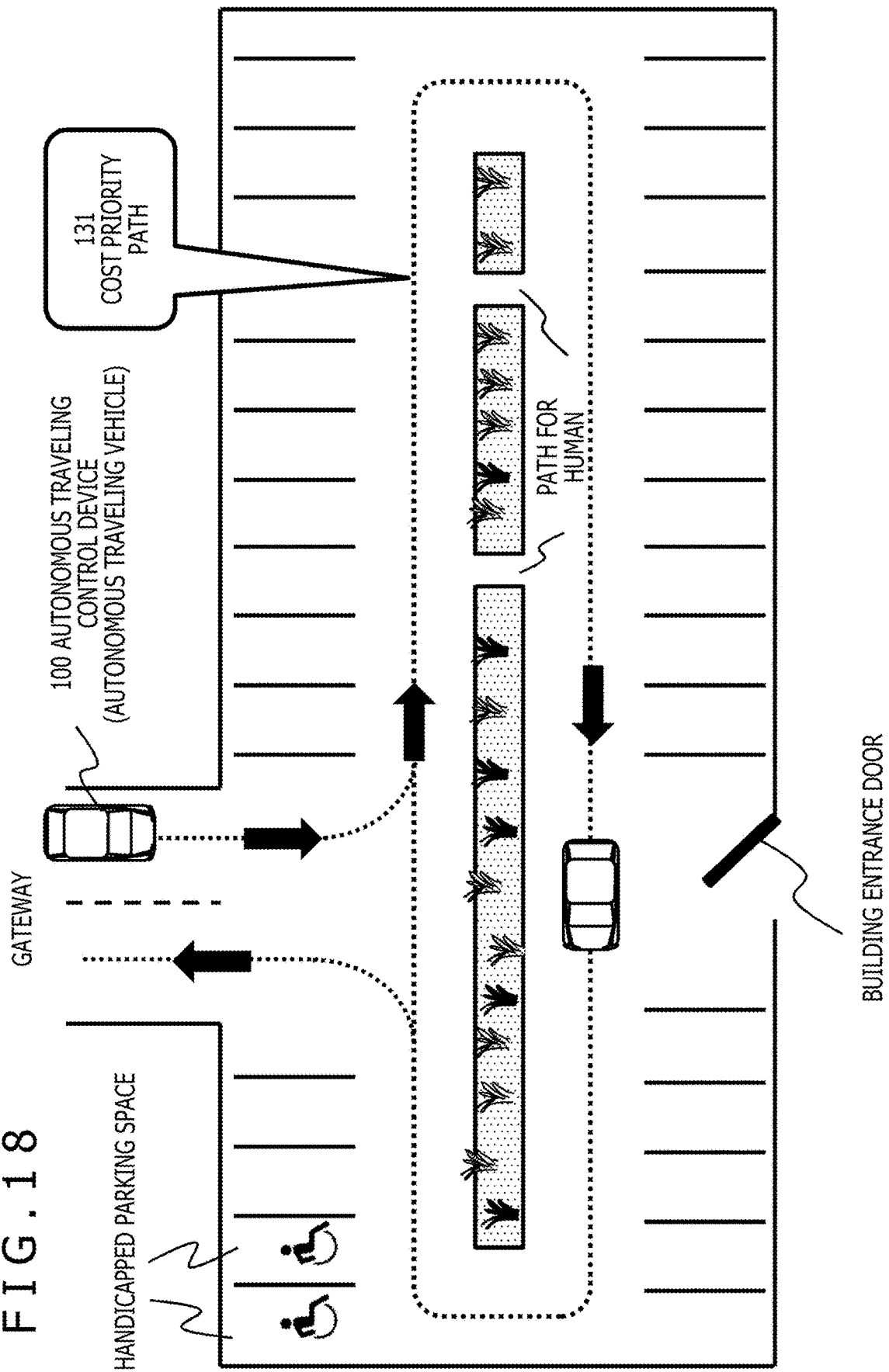
FIG. 18 is a diagram explaining a setting example of a safety priority path corresponding to a dangerous region in a parking lot.

FIG. 18 is a diagram depicting an example of a configuration of a typical parking lot, and the cost priority path 131 in the parking lot.

For example, the autonomous traveling control device (autonomous driving vehicle) 100 enters the parking lot through a gateway, travels along the cost priority path 131 in the parking lot, and parks the vehicle in a vacant parking space where parking is allowed.

However, the parking lot includes a gateway for vehicles, a gateway for humans, a building entrance door, a handicapped parking space, and the like as depicted in the figure. Areas near these regions correspond to dangerous regions where a contact with a human and a vehicle is highly likely to occur.

Accordingly, it is preferable that the autonomous traveling control device (autonomous driving vehicle) 100 travels along a safety priority path avoiding passage through and approach to these dangerous regions.

A setting example of the safety priority path will be described with reference to FIG. 19 and following figures.

Figure 19:
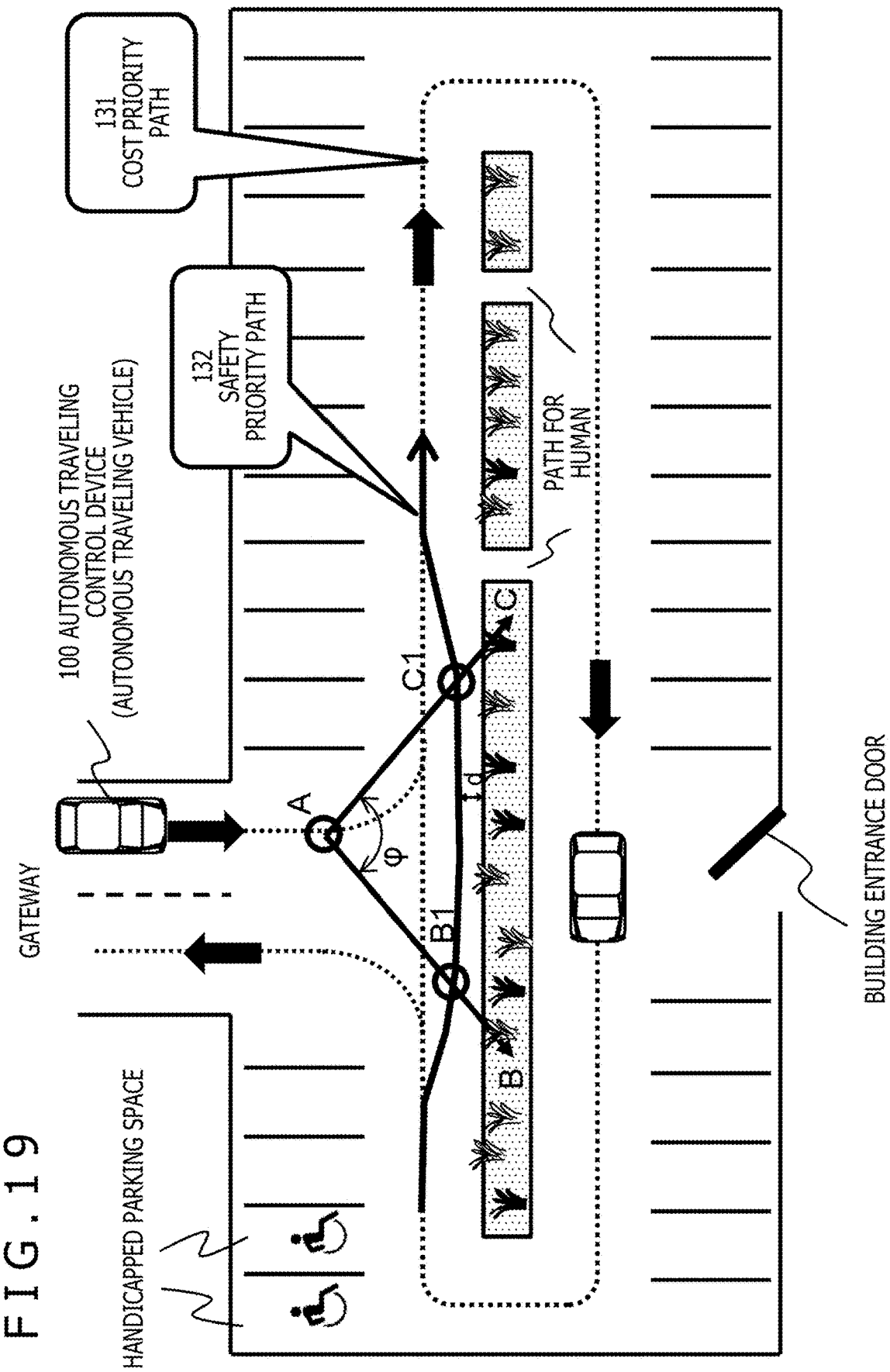
FIG. 19 is a diagram explaining a setting example of a safety priority path corresponding to a dangerous region in a parking lot.

A dangerous region representative point A is set near the gateway for vehicles in FIG. 19.

In addition, as described above, position information associated with the dangerous region and the dangerous region representative point A is recorded in the dangerous region map data 111c corresponding to configuration information included in the map data 111.

In a case of this example, a parking lot management server managing the parking lot may be configured to retain the map data 111.

The map data 111 contains the topology map data 111a, the metric map data 111b, and the dangerous region map data 111c described above with reference to FIG. 10.

The traveling path determination unit 101 of the autonomous traveling control device (autonomous driving vehicle) 100 acquires the dangerous region representative point A near the gateway for vehicles from the map data, or determines the dangerous region representative point A on the basis of the map data. Moreover, two vectors AB and AC forming a flare angle of $\phi$ on the traveling path side are set. Furthermore, a traveling allowable range of the traveling path, or intersections B1 and C1 of the two vectors AB and AC and a line of a distance d from a flower bed in this example, respectively, are set.

A straight line connecting the intersections B1 and C1 is set. The straight line B1-C1 is smoothly connected to the cost priority path 131 set beforehand to generate the safety priority path 132.

For example, the autonomous traveling control device (autonomous driving vehicle) 100 depicted in the figure travels along the safety priority path 132 depicted in FIG. 19. This traveling process allows the autonomous driving control device (autonomous driving vehicle) 100 to achieve safe traveling which reduces a possibility of a contact or a collision with another vehicle near the gateway.

Figure 20:
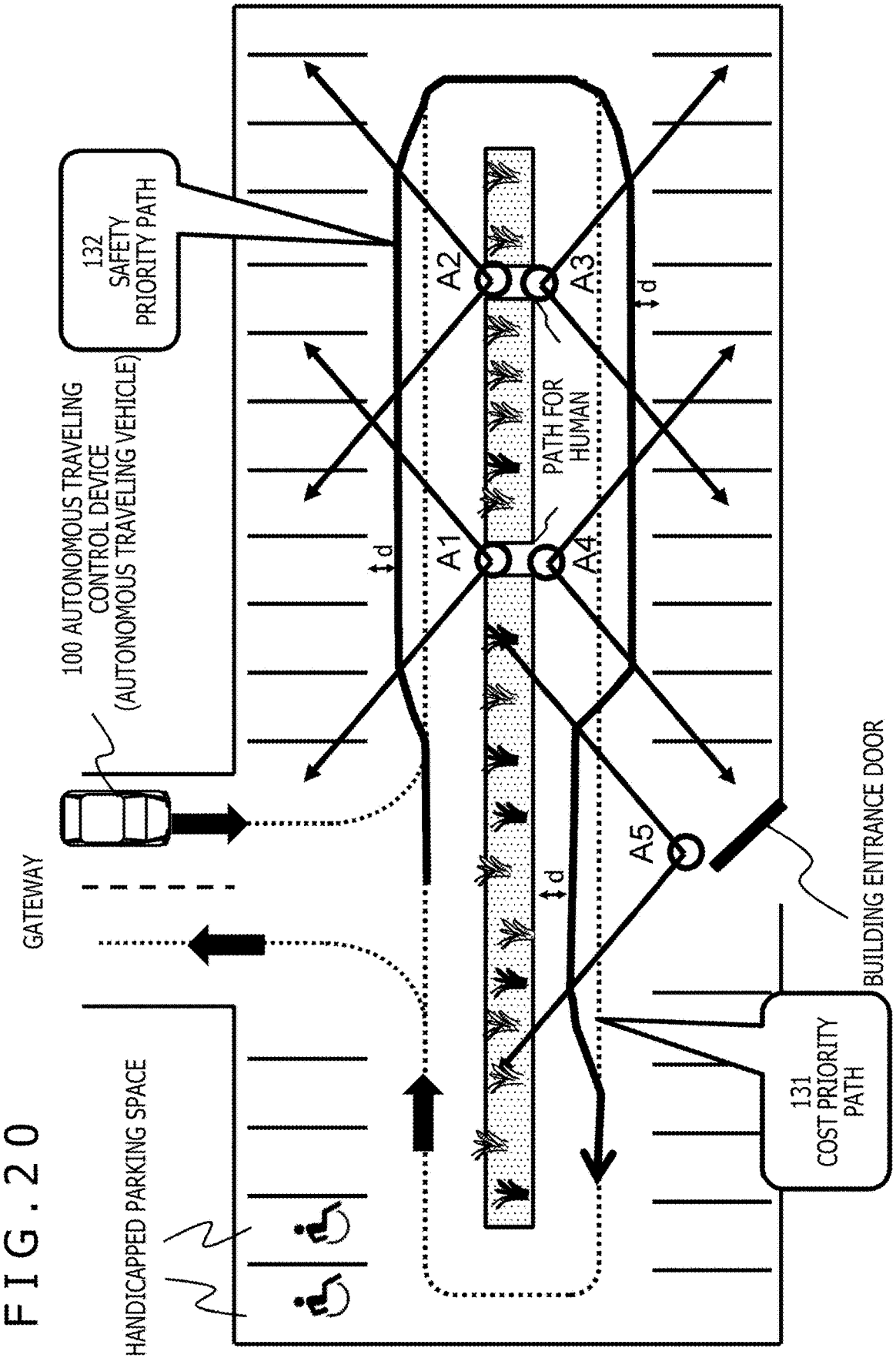
FIG. 20 is a diagram explaining a setting example of a safety priority path corresponding to a dangerous region in a parking lot.

FIG. 20 depicts an example where dangerous region representative points A1 to A5 are set near a passage for humans between flower beds, and a building entrance door.

The safety priority path 132 is generated by executing processing such as vector setting for each of the points.

The autonomous traveling control device (autonomous driving vehicle) 100 travels along the safety priority path 132 depicted in FIG. 20. This traveling process allows the autonomous traveling control device (autonomous driving vehicle) 100 to achieve traveling which reduces a possibility of a contact or a collision with a human near the passages for humans between the floor beds, and the building entrance door.

Figure 21:
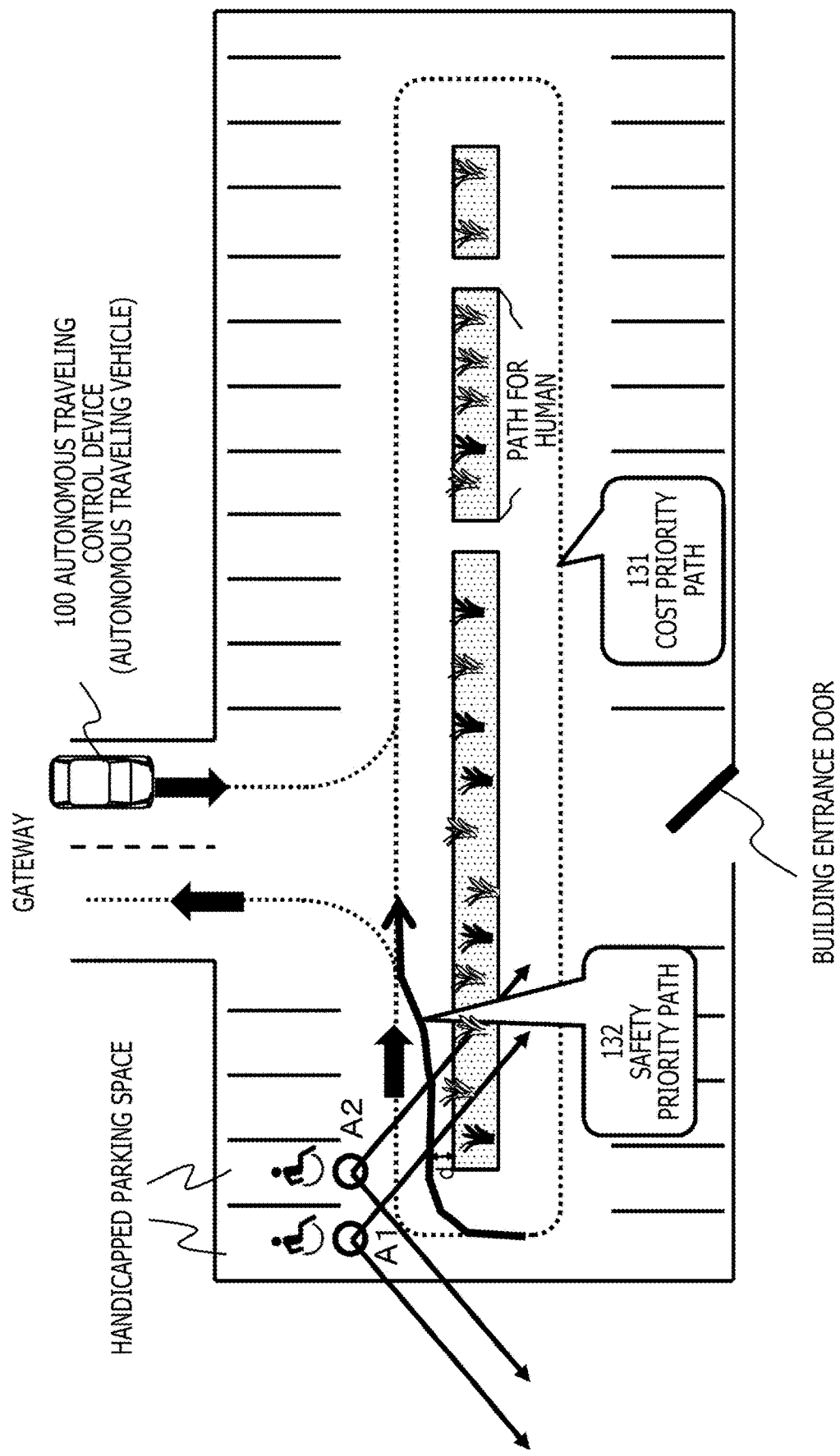
FIG. 21 is a diagram explaining a setting example of a safety priority path corresponding to a dangerous region in a parking lot.

FIG. 21 depicts an example where dangerous region representative points A1 to A2 are set near a handicapped parking space.

The safety priority path 132 is generated by executing processing such as vector setting for each of the points.

The autonomous traveling control device (autonomous driving vehicle) 100 travels along the safety priority path 132 depicted in FIG. 21. This traveling process allows the autonomous traveling control device (autonomous driving vehicle) 100 to achieve traveling which reduces a possibility of a contact or a collision with a vehicle leaving from the handicapped parking space.

[7. Configuration Example of Autonomous Traveling Control Device]

Described next will be a configuration example of the autonomous traveling control device of the present disclosure.

Figure 22:
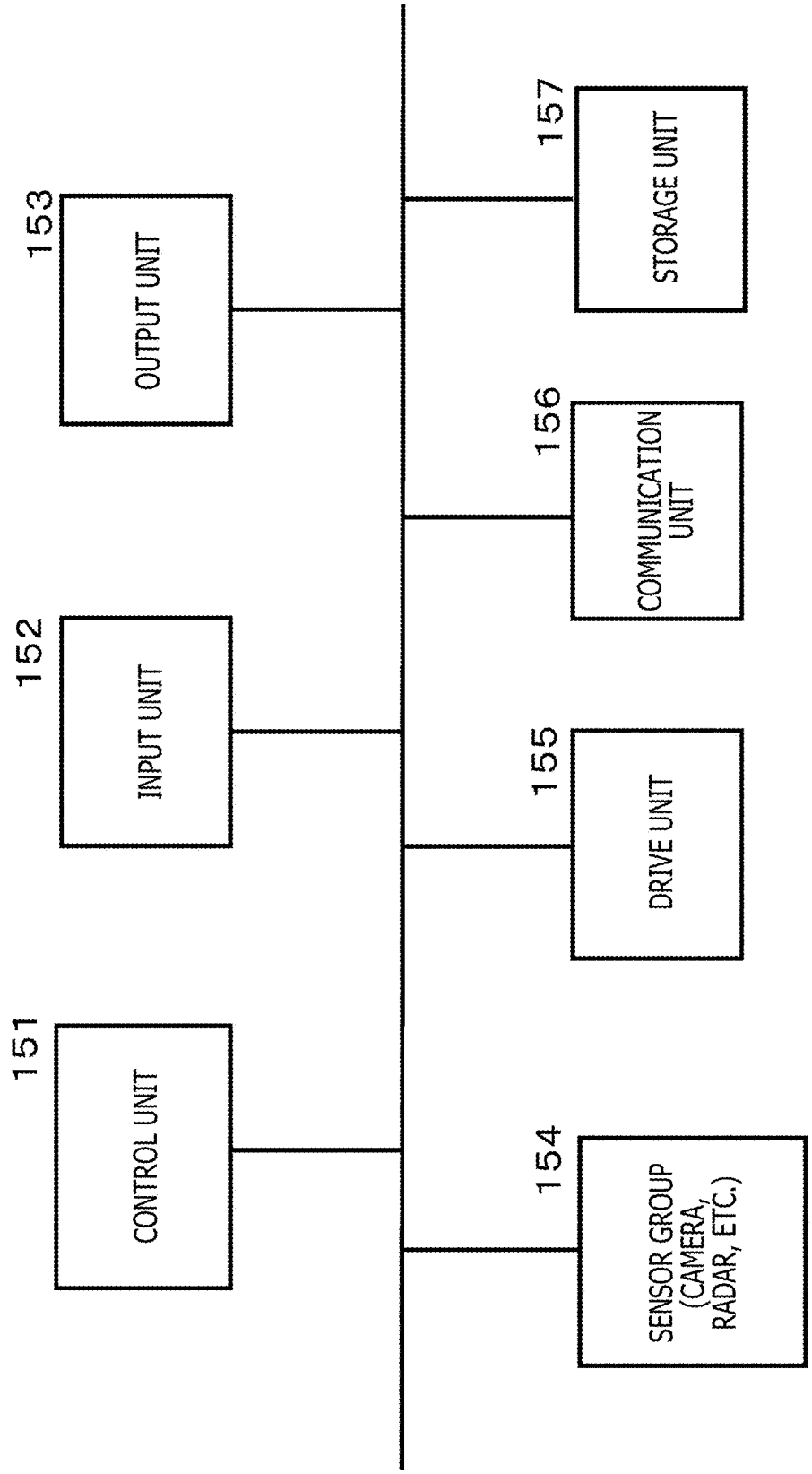
FIG. 22 is a diagram explaining a configuration example of the autonomous traveling control device of the present disclosure.

FIG. 22 is a block diagram depicting a configuration example of the autonomous traveling control device 100 of the present disclosure, such as an autonomous traveling robot and an autonomous driving vehicle.

As depicted in FIG. 22, the autonomous traveling control device 100 includes a control unit 151, an input unit 152, an output unit 153, a sensor group 154, a drive unit 155, a communication unit 156, and a storage unit 157.

The control unit 151 controls processing executed by the autonomous traveling control device 100. For example, the control unit 151 executes processing according to a control program stored in the storage unit 157. The control unit 151 includes a processor having a program executing function.

Note that each of the traveling path determination unit 101 and the traveling control unit 102 described with reference to FIG. 4 corresponds to a constituent element of the control unit 151. For example, processing performed by the traveling path determination unit 101 and the traveling control unit 102 can be executed by the control unit 151 under a program stored in the storage unit 157.

The input unit 152 is an interface through which various types of data are allowed to be input from a user, and is constituted by a touch panel, a code reading unit, various types of switches, and the like.

The output unit 153 is an output unit constituted by a speaker for outputting alerts and voices, a display for outputting images, and a unit for outputting light or the like.

The sensor group 154 is constituted by various types of sensors such as a camera, a microphone, a radar, and a distance sensor.

The drive unit 155 is constituted by a wheel drive unit for moving the autonomous traveling control device, a direction control mechanism, and the like.

For example, the communication unit 156 executes a communication process for communicating with an external device or the like, such as a robot management server, a map information providing server, and a building management server.

The storage unit 157 stores programs executed by the control unit 151, and others such as robot information and transportation equipment information.

[8. Configuration Example of Vehicle Control System, and Example of Sensing Regions of Vehicle]

Figure 23:
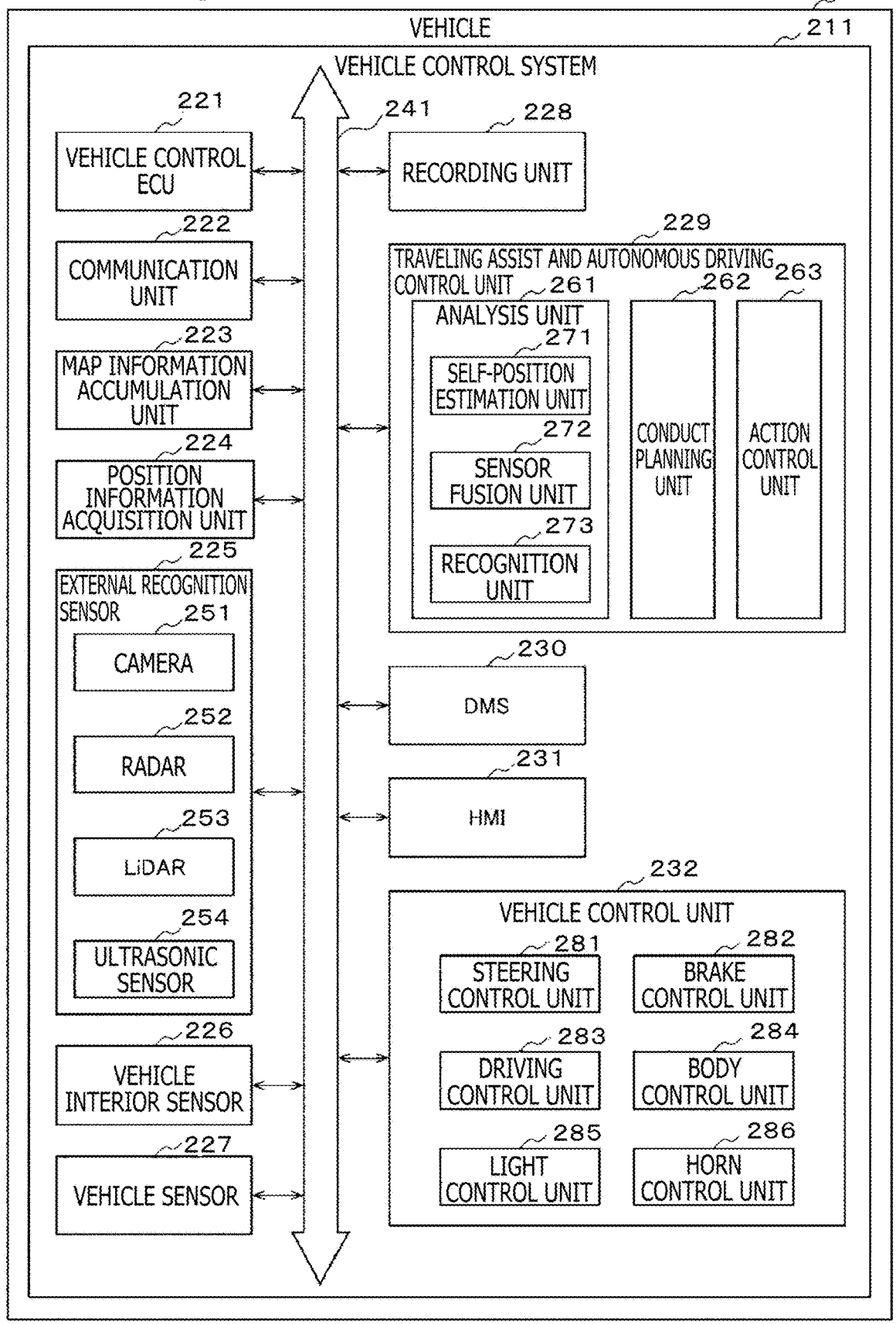
FIG. 23 is a block diagram depicting a configuration example of a vehicle control system.

FIG. 23 is a block diagram depicting a configuration example of a vehicle control system 211 as an example of a mobile device control system to which the present technology is applied.

The vehicle control system 211 is provided on a vehicle 200, and performs processing associated with traveling assistance and autonomous driving of the vehicle 200.

The vehicle control system 211 includes a vehicle control ECU (Electronic Control Unit) 221, a communication unit 222, a map information accumulation unit 223, a position information acquisition unit 224, an external recognition sensor 225, a vehicle interior sensor 226, a vehicle sensor 227, a recording unit 228, a traveling assist and autonomous driving control unit 229, a DMS (Driver Monitoring System) 230, an HMI (Human Machine Interface) 231, and a control unit 232.

The vehicle control ECU 221, the communication unit 222, the map information accumulation unit 223, the position information acquisition unit 224, the external recognition sensor 225, the vehicle interior sensor 226, the vehicle sensor 227, the recording unit 228, the traveling assist and autonomous driving control unit 229, the driver monitoring system (DMS) 230, the human machine interface (HMI) 231, and the control unit 232 are communicably connected to each other via a communication network 41. For example, the communication network 241 is constituted by an in-vehicle communication network, a bus, or the like in conformity with standards of digital bidirectional communication, such as a CAN (Controller Area Network), a LIN (Local Interconnect Network), a LAN (Local Area Network), FlexRay (registered trademark), and Ethernet (registered trademark). The communication network 241 to be used may be selected according to types of data handled by the communication. For example, a CAN is applied to communication of data associated with vehicle control, while Ethernet is applied to communication of large volume data. In addition, there is also a case where the respective units of the vehicle control system 211 are directly connected to each other through wireless communication on an assumption of communication at a relatively near distance, such as near field communication (NFC (Near Field Communication)) and Bluetooth (registered trademark), without using the communication network 241.

Moreover, it is assumed hereinafter that description of the communication network 241 will be omitted in a case of communication between the respective units of the vehicle control system 211 via the communication network 241. For example, in a case of communication between the vehicle control ECU 221 and the communication unit 222 via the communication network 241, only description of communication between the processor and the communication unit 222 will be made.

For example, the vehicle control ECU 221 is constituted by any one of various types of processors such as a CPU (Central Processing Unit) and an MPU (Micro Processing Unit). The vehicle control ECU 221 controls the whole or a part of functions of the vehicle control system 211.

The communication unit 222 communicates with various types of devices of the inside or the outside of the vehicle, other vehicles, servers, base stations, and the like, and transmits and receives various types of data. For this transmission and reception, the communication unit 222 is allowed to communicate using a plurality of communication methods.

An outline of communication executable by the communication unit 222 for communicating with the outside of the vehicle will be described. For example, the communication unit 222 communicates with a server present in an external network (hereinafter referred to as external server) via a base station or an access point using a wireless communication method such as 5G (fifth generation mobile communication system), LTE (Long Term Evolution), and DSRC (Dedicated Short Range Communications). For example, the external network communicating with the communication unit 222 is the Internet, a cloud network, or a network unique to a provider. The communication method used by the communication unit 222 for communicating with the external network is not limited to a particular method but may be any wireless communication method capable of achieving digital bidirectional communication at a predetermined communication speed or higher and at a predetermined distance or longer.

Moreover, for example, the communication unit 222 is capable of communicating with a terminal present near the own vehicle using a P2P (Peer To Peer) technology. For example, the terminal present near the own vehicle is a terminal attached to a mobile body moving at a relatively low speed, such as a pedestrian and a bicycle, a terminal installed at a fixed position such as a store, or an MTC (Machine Type Communication) terminal. Moreover, the communication unit 222 also achieves V2X communication. For example, V2X communication refers to communication between the own vehicle and others, such as vehicle to vehicle (Vehicle to Vehicle) communication with other vehicles, vehicle to infrastructure (Vehicle to Infrastructure) communication with roadside devices, vehicle to home (Vehicle to Home) communication with home, and vehicle to pedestrian (Vehicle to Pedestrian) communication with a terminal or the like carried by a pedestrian.

For example, the communication unit 222 is capable of receiving, from the outside, a program for updating software which controls operations of the vehicle control system 211 (Over The Air). The communication unit 222 is also capable of receiving map information, traffic information, information associated with surroundings of the vehicle 200, and others from the outside. Moreover, for example, the communication unit 222 is capable of transmitting information associated with the vehicle 200, information associated with surroundings of the vehicle 200, and others to the outside. For example, information associated with the vehicle 200 and transmitted from the communication unit 222 to the outside includes data indicating a state of the vehicle 200, and a recognition result obtained by the recognition unit 273. Moreover, for example, the communication unit 222 establishes communication corresponding to a vehicle emergency system such as e-calls.

An outline of communication executable by the communication unit 222 for communicating with the inside of the vehicle will be described. The communication unit 222 is capable of communicating with respective devices in the vehicle using wireless communication, for example. The communication unit 222 is capable of communicating with the devices in the vehicle by wireless communication such as a wireless LAN, Bluetooth, NFC, WUSB (Wireless USB) at a predetermined communication speed or higher by using a communication method capable of achieving digital bidirectional communication. Communication by the communication unit 222 is not limited to this type of communication. The communication unit 222 is capable of communicating with the respective devices in the vehicle using wired communication. For example, the communication unit 222 is capable of communicating with the respective devices in the vehicle by wired communication using a cable connected to a not-depicted connection terminal. For example, the communication unit 222 is capable of communicating with the respective devices in the vehicle using a communication method capable of achieving digital bidirectional communication by wired communication at a predetermined communication speed or higher, such as a USB (Universal Serial Bus), HDMI (registered trademark) (High-Definition Multimedia Interface), and an MHL (Mobile High-definition Link).

For example, the devices in the vehicle herein refer to devices not connected to the communication network 241 in the vehicle. It is assumed, for example, that the devices in the vehicle include a mobile device or a wearable device carried by a person on board such as a driver, and an information device loaded into the vehicle and temporarily installed.

For example, the communication unit 222 receives electromagnetic waves transmitted from a vehicle information and communication system (VICS (registered trademark)

(Vehicle Information and Communication System)), such as a radio beacon, an optical beacon, and FM multiplex broadcasting.

The map information accumulation unit 223 accumulates either one or both of a map acquired from the outside, and a map created by the vehicle 200. For example, the map information accumulation unit 223 accumulates a three-dimensional high-accuracy map, and a global map having accuracy lower than that of the high-accuracy map and covering a wide area.

For example, the high-accuracy map is a dynamic map, a point cloud map, or a vector map. For example, the dynamic map is a map including four layers constituted by dynamic information, semi-dynamic information, semi-static information, and static information, and is provided for the vehicle 200 from an external server or the like. The point cloud map is a map constituted by a point cloud (point cloud data). It is assumed herein that the vector map herein refers to a map which includes traffic information or the like, such as positions of lanes and traffic lights, associated with the point cloud map, and is matched with ADAS (Advanced Driver Assistance System).

For example, the point cloud map and the vector map may be provided from an external server or the like, or may be created by the vehicle 200 as a map for matching with a local map described below on the basis of a result of sensing obtained by the radar 252, a LiDAR 253, or the like, and then accumulated in the map information accumulation unit 223. Moreover, in a case where a high-accuracy map is provided from an external server or the like, map data for several hundreds meters around, for example, associated with a planned path where the vehicle 200 will travel from now is acquired from an external server or the like to reduce a communication volume.

The position information acquisition unit 224 receives GNSS signals from a GNSS satellite, and acquires position information associated with the vehicle 200. The received GNSS signals are supplied to the traveling assist and autonomous driving control unit 229. Note that the position information acquisition unit 224 is not required to employ the method using GNSS signals, but may acquire position information using a beacon, for example.

The external recognition sensor 225 includes various types of sensors used for recognition of circumstances outside the vehicle 200, and supplies sensor data obtained from the respective sensors to the respective units of the vehicle control system 211. Any types and any number of sensors may be included in the external recognition sensor 225.

For example, the external recognition sensor 225 includes a camera 251, a radar 252, a LiDAR (Light Detection and Ranging, Laser Imaging Detection and Ranging) 253, and an ultrasonic sensor 254. The external recognition sensor 225 is not required to include these sensors, but may have a configuration including one or more types of sensors selected from the camera 251, the radar 252, the LiDAR 253, and the ultrasonic sensor 254. The number of each of the camera 251, the radar 252, the LiDAR 253, and the ultrasonic sensor 254 is not limited to a particular number but may be any number practically installable on the vehicle 200. Moreover, the types of the sensors included in the external recognition sensor 225 are not limited to these examples. The external recognition sensor 225 may include other types of sensors. Examples of sensing regions of the respective sensors included in the external recognition sensor 225 will be described below.

Note that the imaging method used by the camera 251 is not limited to a particular method but may be any method capable of measuring a distance. For example, any one of various types of cameras, such as a ToF (Time Of Flight) camera, a stereo camera, a monocular camera, and an infrared camera may be adopted as the camera 251 as necessary. The camera 251 is not limited to the distance measurement camera, but may be of a type for simply acquiring captured images.

Moreover, for example, the external recognition sensor 225 may include an environment sensor for detecting an environment for the vehicle 200. The environment sensor is a sensor for detecting an environment such as weather, meteorology, and brightness, and may include various types of sensors such as a raindrop sensor, a fog sensor, a sunlight sensor, a snow sensor, and a luminance sensor.

Furthermore, for example, the external recognition sensor 225 includes a microphone used for detection of sound around the vehicle 200 and a position of a sound source or for other purposes.

The vehicle interior sensor 226 includes various types of sensors for detecting information associated with the inside of the vehicle, and supplies sensor data obtained by the respective sensors to the respective units of the vehicle control system 211. The types and the numbers of the various types of sensors included in the vehicle interior sensor 226 are not limited to particular types and numbers, but may be any types and numbers practically installable on the vehicle 200.

For example, the vehicle interior sensor 226 may include one or more types of sensors selected from a camera, a radar, a seat sensor, a steering wheel sensor, a microphone, and a biosensor. For example, any one of cameras capable of measuring a distance and using various types of imaging methods, such as a ToF camera, a stereo camera, a monocular camera, and an infrared camera may be adopted as the camera included in the vehicle interior sensor 226. The camera included in the vehicle interior sensor 226 is not limited to the distance measuring camera, but may be of a type for simply acquiring captured images. For example, the biosensor included in the vehicle interior sensor 226 is provided on a seat, a steering wheel, or the like, and detects various types of biological information associated with a person on board such as a driver.

The vehicle sensor 227 includes various types of sensors for detecting a state of the vehicle 200 and supplies sensor data obtained by the respective sensors to the respective units of the vehicle control system 211. The types and the numbers of the various types of sensors included in the vehicle sensor 227 are not limited to particular types and numbers, but may be any types and numbers practically installable on the vehicle 200.

For example, the vehicle sensor 227 includes a speed sensor, an acceleration sensor, an angular speed sensor (gyro sensor), and an inertial measurement unit (IMU (Inertial Measurement Unit)) integrating these. For example, the vehicle sensor 227 includes a steering angle sensor for detecting a steering angle of the steering wheel, a yaw rate sensor, an acceleration sensor for detecting an operated amount of an acceleration pedal, and a brake sensor for detecting an operated amount of a brake pedal. For example, the vehicle sensor 227 includes a rotation sensor for detecting an engine speed and a motor speed, an air pressure sensor for detecting an air pressure of a tire, a slip ratio sensor for detecting a slip ratio of a tire, and a wheel speed sensor for detecting a rotation speed of a wheel. For example, the vehicle sensor 227 includes a battery sensor for detecting a residual quantity and a temperature of a battery, and a shock sensor for detecting a shock received from the outside.

The recording unit 228 includes at least either a non-volatile storage medium or a volatile storage medium, and stores data and programs. For example, the recording unit 228 is used to function as an EEPROM (Electrically Erasable Programmable Read Only Memory) and a RAM (Random Access Memory). A magnetic storage device such as an HDD (Hard Disc Drive), a semiconductor storage device, an optical storage device, and a magneto-optical storage device are applicable to the storage medium. The recording unit 228 records various types of programs and data used by the respective units of the vehicle control system 211. For example, the recording unit 228 includes an EDR (Event Data Recorder) and a DSSAD (Data Storage System for Automated Driving), and records information associated with the vehicle 200 before and after an event such as an accident, and biological information acquired by the vehicle interior sensor 226.

The traveling assist and autonomous driving control unit 229 controls traveling assistance and autonomous driving of the vehicle 200. For example, the traveling assist and autonomous driving control unit 229 includes an analysis unit 261, a conduct planning unit 262, and an action control unit 263.

The analysis unit 261 performs an analysis process for analyzing circumstances of the vehicle 200 and surroundings. The analysis unit 261 includes a self-position estimation unit 271, a sensor fusion unit 272, and a recognition unit 273.

The self-position estimation unit 271 estimates a self-position of the vehicle 200 on the basis of sensor data received from the external recognition sensor 225, and a high-accuracy map accumulated in the map information accumulation unit 223. For example, the self-position estimation unit 271 generates a local map on the basis of sensor data received from the external recognition sensor 225, and executes matching between the local map and the high-accuracy map to estimate the self-position of the vehicle 200. For example, the position of the vehicle 200 is defined on the basis of a center of a pair of axles of rear wheels.

For example, the local map is a three-dimensional high-accuracy map or an occupancy grid map (Occupancy Grid Map) created using a technology such as SLAM (Simultaneous Localization and Mapping). For example, the three-dimensional high-accuracy map is a point cloud map or the like described above. The occupancy grid map is a map which indicates an occupation state of an object in units of grid having a predetermined size and produced by dividing a three-dimensional or two-dimensional space around the vehicle 200. For example, the occupation state of the object is indicated by presence or absence of the object or a presence probability. For example, the local map is also used for a detection process and a recognition process for detecting and recognizing circumstances of the outside of the vehicle 200 by the recognition unit 273.

Note that the self-position estimation unit 271 may estimate the self-position of the vehicle 200 on the basis of GNSS signals, and sensor data received from the vehicle sensor 227.

The sensor fusion unit 272 performs a sensor fusion process for obtaining new information by combining a plurality of different types of sensor data (e.g., image data supplied from the camera 251, and sensor data supplied from the radar 252). Examples of the method for combining different types of sensor data include integration, fusion, unification, and the like.

The recognition unit 273 executes a detection process for detecting circumstances of the outside of the vehicle 200, and a recognition process for recognizing circumstances of the outside of the vehicle 200.

For example, the recognition unit 273 performs the detection process and the recognition process for detecting and recognizing circumferences of the outside of the vehicle 200 on the basis of information received from the external recognition sensor 225, information received from the self-position estimation unit 271, information received from the sensor fusion unit 272, and the like.

Specifically, for example, the recognition unit 273 performs a detection process, a recognition process, and the like for detecting and recognizing an object around the vehicle 200. For example, the detection process for detecting the object is a process for detecting presence or absence, a size, a shape, a position, movement, and the like of the object. For example, the recognition process for recognizing the object is a process for recognizing an attribute of the object such as a type, or for identifying a particular object. However, clear distinction between the detection process and the recognition process is not necessarily needed. These processes are overlapped in some cases.

For example, the recognition unit 273 detects an object around the vehicle 200 by executing clustering which classifies point clouds based on sensor data obtained by the LiDAR 253, the radar 252, or the like into blocks of point clouds. In this manner, the presence or absence, the size, the shape, and the position of the object around the vehicle 200 are detected.

For example, the recognition unit 273 detects movement of the object around the vehicle 200 by performing tracking for following movement of a block of point clouds classified by clustering. In this manner, a speed and a traveling direction (movement vector) of the object around the vehicle 200 are detected.

For example, the recognition unit 273 detects or recognizes a vehicle, a human, a bicycle, an obstacle, a structure, a road, a traffic light, a traffic sign, a road sign, or the like from image data supplied from the camera 251. Moreover, the recognition unit 273 may recognize a type of the object around the vehicle 200 by performing a recognition process such as semantic segmentation.

For example, the recognition unit 273 may perform a recognition process for recognizing traffic rules around the vehicle 200 on the basis of a map accumulated in the map information accumulation unit 223, a self-position estimation result obtained by the self-position estimation unit 271, and an object recognition result around the vehicle 200 obtained by the recognition unit 273. The recognition unit 273 performing this process is capable of recognizing positions and states of traffic lights, contents of traffic signs and road signs, contents of traffic regulations, travelable lanes, and others.

For example, the recognition unit 273 is capable of performing a recognition process for recognizing an environment around the vehicle 200. It is assumed that examples of the surrounding environment corresponding to a target of recognition by the recognition unit 273 include weather, temperature, humidity, brightness, and a road surface state.

The conduct planning unit 262 creates a conduct plan of the vehicle 200. For example, the conduct planning unit 262 creates the conduct plan by performing processing for path planning and path following.

Note that the path planning (Global path planning) is a process for planning a rough path from a start to a goal. This path planning is called track planning, and also contains processing for track generation (Local path planning) of a track allowing safe and smooth traveling near the vehicle 200 in consideration of motion characteristics of the vehicle 200 in a path planned by the path planning. The path planning may be distinguished from long-term path planning, and start generation may be distinguished from short-term path planning or local path planning. The safety priority path represents a concept similar to that of start generation, short-term path planning, or local path planning.

The path following is a process for planning an action for traveling safely and correctly on a path planned by the path planning within a planned time. For example, the conduct planning unit 262 may calculate a target speed and a target angular speed of the vehicle 200 on the basis of a result of processing of this path following.

The action control unit 263 controls an action of the vehicle 200 to achieve a conduct plan created by the conduct planning unit 262.

For example, the action control unit 263 controls a steering control unit 281, a brake control unit 282, and a driving control unit 283 included in the vehicle control unit 232 described below to perform acceleration/deceleration control and direction control such that the vehicle 200 travels on the track calculated by the track planning. For example, the action control unit 263 performs cooperative control for a purpose of achieving ADAS functions such as collision avoidance or shock reduction, following traveling, constant vehicle speed traveling, collision warning to the own vehicle, and lane departure warning to the own vehicle. For example, the action control unit 263 performs cooperative control for a purpose of autonomous driving for autonomously traveling without the necessity of an operation by the driver, or for other purposes.

The DMS 230 performs an authentication process for authenticating the driver, a recognition process for recognizing a state of the driver, and the like on the basis of sensor data received from the vehicle interior sensor 226, input data input to the HMI 231 described below, and the like. It is assumed that examples of the state of the driver corresponding to a target of recognition by the DMS 230 in this case include a physical condition, a wakefulness level, a concentration level, a fatigue level, a visual line direction, a drunkenness level, a driving operation, and a posture.

Note that the DMS 230 may perform an authentication process for authenticating a person on board other than the driver, and a recognition process for recognizing a state of the person on board. Moreover, for example, the DMS 230 may perform a recognition process for recognizing circumstances of the inside of the vehicle on the basis of sensor data received from the vehicle interior sensor 226. It is assumed that examples of the circumstances of the inside of the vehicle corresponding to a target of recognition include temperature, humidity, brightness, a smell, and the like.

The HMI 231 inputs various types of data, instructions, and the like, and presents various types of data to the driver or the like.

An outline of input of data by the HMI 231 will be described. The HMI 231 includes an input device through which a person inputs data. The HMI 231 generates an input signal on the basis of data, an instruction, or the like input through the input device, and supplies the generated input signal to the respective units of the vehicle control system 211. The HMI 231 includes an operator such as a touch panel, a button, a switch, and a lever as the input device. The HMI 231 is not required to include these examples, but may further include an input device through which information can be input by a method other than a manual operation, such as a method using voices or gestures. Moreover, for example, the HMI 231 may adopt, as the input device, a remote control device using infrared light or radio waves, or an external connection device such as a mobile device or a wearable device handling operations of the vehicle control system 211.

An outline of presentation of data by the HMI 231 will be described. The HMI 231 generates visual information, auditory information, and haptic information given to the person on board or the outside of the vehicle. Moreover, the HMI 231 performs output control for controlling output, output contents, output timing, an output method, and the like of these generated information. For example, the HMI 231 generates and outputs, as visual information, information indicated by images or light, such as an operation screen, state display of the vehicle 200, warning display, and a monitoring image indicating circumstances around the vehicle 200. Moreover, for example, the HMI 231 generates and outputs, as auditory information, information indicated by sound, such as voice guidance, warning sound, and a warning message. Furthermore, for example, the HMI 231 generates and outputs, as haptic information, information given to haptic sense of the person on board, such as force, vibration, and movement.

Examples applicable to an output device through which visual information is output from the HMI 231 include a display device which presents visual information by displaying images itself, and a projector device which presents visual information by projecting images. Note that the display device may be a device which displays visual information within a visual field of the person on board, such as a head-up display, a transmission-type display, and a wearable device having an AR (Augmented Reality) function, as well as a display including an ordinary display. In addition, the HMI 231 may also employ, as the output device for outputting visual information, a display device included in a navigation device, an instrument panel, a CMS (Camera Monitoring System), an electronic mirror, a lamp, and the like provided on the vehicle 200.

Examples applicable to an output device through which the HMI 231 outputs auditory information include an audio speaker, a headphone, and an earphone.

Examples applicable to an output device through which the HMI 231 outputs haptic information include a haptic element using a haptics technology. For example, the haptics element is provided at a portion in contact with the person on the vehicle 200, such as a steering wheel and a seat.

The vehicle control unit 232 controls the respective units of the vehicle 200. The vehicle control unit 232 includes the steering control unit 281, the brake control unit 282, the driving control unit 283, a body control unit 284, a light control unit 285, and a horn control unit 286.

The steering control unit 281 performs detection, control, and the like of a state of a steering system of the vehicle 200. For example, the steering system includes a steering mechanism equipped with a steering wheel and the like, and an electric power steering. For example, the steering control unit 281 includes a control unit for controlling the steering system, such as an ECU, and an actuator for driving the steering system.

The brake control unit 282 performs detection, control, and the like of a state of a brake system of the vehicle 200. For example, the brake system includes a brake mechanism equipped with a brake pedal and the like, an ABS (Antilock Brake System), and a regenerative brake mechanism. For example, the brake control unit 282 includes a control unit for controlling the brake system, such as an ECU.

The driving control unit 283 performs detection, control, and the like of a state of a drive system of the vehicle 200. For example, the drive system includes an acceleration pedal, a driving force generation device for generating driving force, such as an internal combustion engine and a driving motor, and a driving force transmission mechanism for transmitting driving force to wheels. For example, the driving control unit 283 includes a control unit and the like for controlling the drive system, such as an ECU.

The body control unit 284 performs detection, control, and the like of a state of a body system of the vehicle 200. For example, the body system includes a keyless entry system, a smart key system, a power window device, a power seat, an air conditioner, an airbag, a seat belt, and a shift lever. For example, the body control unit 284 includes a control unit for controlling the body system, such as an ECU.

The light control unit 285 performs detection, control, and the like of states of various types of lights of the vehicle 200. It is assumed that examples of a control target include a headlight, a backlight, a fog light, a turn signal, a brake light, a projection, and display of a bumper. The light control unit 285 includes a control unit and the like for controlling the lights, such as an ECU, for example.

The horn control unit 286 performs detection, control, and the like of a state of a car horn of the vehicle 200. For example, the horn control unit 286 includes a control unit and the like for controlling the car horn, such as an ECU.

Figure 24:
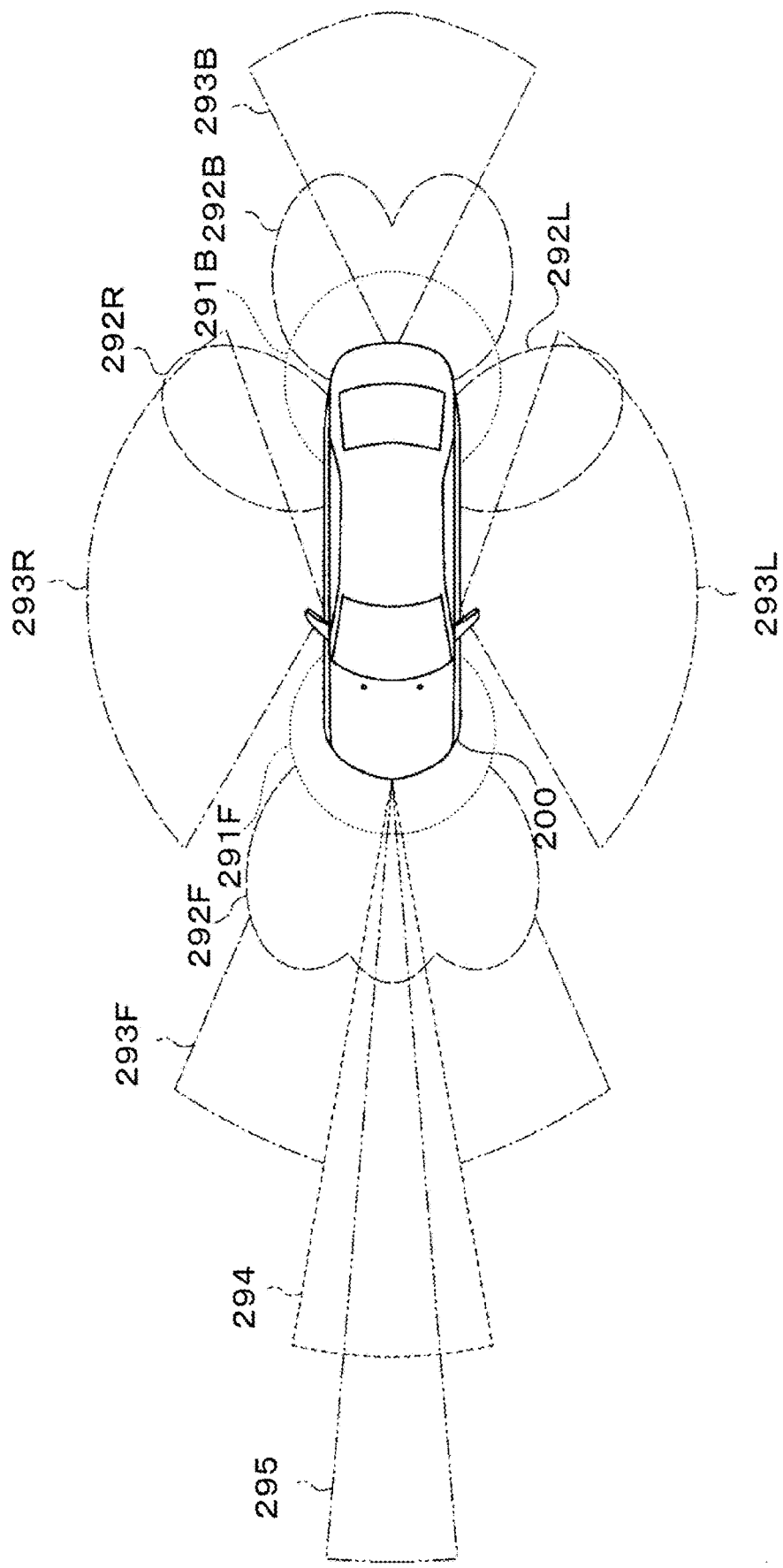
FIG. 24 is a diagram depicting an example of sensing regions.

FIG. 24 is a diagram depicting an example of sensing regions defined by the camera 251, the radar 252, the LiDAR 253, the ultrasonic sensor 254, and the like of the external recognition sensor 225 of FIG. 23. Note that FIG. 24 schematically depicts a situation of the vehicle 200 as viewed from above. The left end side corresponds to the front end (front) side of the vehicle 200, while the right end side corresponds to the rear end (rear) side of the vehicle 200.

Each of a sensing region 291F and a sensing region 291B indicates an example of the sensing region of the ultrasonic sensor 254. The sensing region 291F covers surroundings of the front end of the vehicle 200 using a plurality of the ultrasonic sensors 254. The sensing region 291B covers surroundings of the rear end of the vehicle 200 using a plurality of the ultrasonic sensors 254.

For example, sensing results obtained at the sensing region 291F and the sensing region 291B are used for parking assistance and the like of the vehicle 200.

Each of a sensing region 292F to a sensing region 292B indicates an example of the sensing region of the radar 252 for a short distance or a middle distance. The sensing region 292F covers an area up to a position farther than the area of the sensing region 291F in front of the vehicle 200. The sensing region 292B covers an area up to a position farther than the area of the sensing region 291B at the rear the vehicle 200. A sensing region 292L covers surroundings of the left side surface at the rear of the vehicle 200. A sensing region 292R covers surroundings of the right side surface at the rear of the vehicle 200.

For example, a sensing result obtained at the sensing region 292F is used for detection of a vehicle, a pedestrian, or the like present in front of the vehicle 200. For example, a sensing result obtained at the sensing region 292B is used for a collision prevention function or the like at the rear of the vehicle 200. For example, sensing results obtained at the sensing region 292L and the sensing region 292R are used for detection of an object present at a blind spot on the side of the vehicle 200.

Each of a sensing region 293F to a sensing region 293B indicates an example of the sensing region of the camera 251. The sensing region 293F covers an area up to a position farther than the area of the sensing region 292F in front of the vehicle 200. The sensing region 293B covers an area up to a position farther than the area of the sensing region 292B at the rear the vehicle 200. A sensing region 293L covers surroundings of the left side surface of the vehicle 200. A sensing region 293R covers surroundings of the right side surface of the vehicle 200.

For example, a sensing result obtained at the sensing region 293F can be used for recognition of traffic lights and traffic signs, a lane departure prevention assistance system, and an automatic headlight control system. For example, a sensing result obtained at the sensing region 293B can be used for parking assistance and a surround-view system. For example, sensing results obtained at the sensing region 293L and the sensing region 293R can be used for the surround-view system.

A sensing region 294 indicates an example of the sensing region of the LiDAR 253. The sensing region 294 covers an area up to a position farther than the area of the sensing region 293F in front of the vehicle 200. On the other hand, the sensing region 294 has a narrower range in the left-right direction than that of the sensing region 293F.

For example, a sensing result obtained at the sensing region 294 is used for detection or the like of an object such as a surrounding vehicle.

A sensing region 295 indicates an example of a sensing region of the radar 252 for a long distance.

The sensing region 295 covers an area up to a position farther than the area of the sensing region 294 in front of the vehicle 200. On the other hand, the sensing region 295 has a narrower range in the left-right direction than that of the sensing region 294.

For example, a sensing result obtained at the sensing region 295 is used for ACC (Adaptive Cruise Control), emergency braking, collision prevention, or the like.

Note that each of the sensing regions of the respective sensors of the camera 251, the radar 252, the LiDAR 253, and the ultrasonic sensor 254 included in the external recognition sensor 225 may have various types of configurations other than the configuration depicted in FIG. 24. Specifically, the ultrasonic sensor 254 may also sense the sides of the vehicle 200, or the LiDAR 253 may sense the rear of the vehicle 200. Moreover, the installation positions of the respective sensors are not limited to the respective examples described above. Furthermore, the number of each of the sensors may be either one or more than one.

[9. Presentation of Data Example by Display Device]

Described next will be a data display example using a display device included in a vehicle.

It is difficult for a user (driver) of an autonomous driving vehicle to clearly recognize which determination is to be made, which situation is to be taken into consideration for making this determination, and which control to be performed by an autonomous driving function of the vehicle. In this case, the user feel uneasy.

For solving this problem, it is effective to display, as a UI, a process and a result of recognition and determination made by the autonomous driving vehicle on a display device provided at the driver's seat or the rear seat, for example.

The user viewing the UI can visually and intuitively recognize the determination and the control made by the autonomous driving vehicle.

The user can understand the determination made by the autonomous driving vehicle, and determine which control is to be performed beforehand by checking the UI. Accordingly, the user can feel at ease. Moreover, it can be clarified whether or not different recognition or determination suited for actual circumstances has been made. Accordingly, a case other than this case, i.e., whether or not malfunction or abnormality has been caused can be easily determined.

Figure 25:
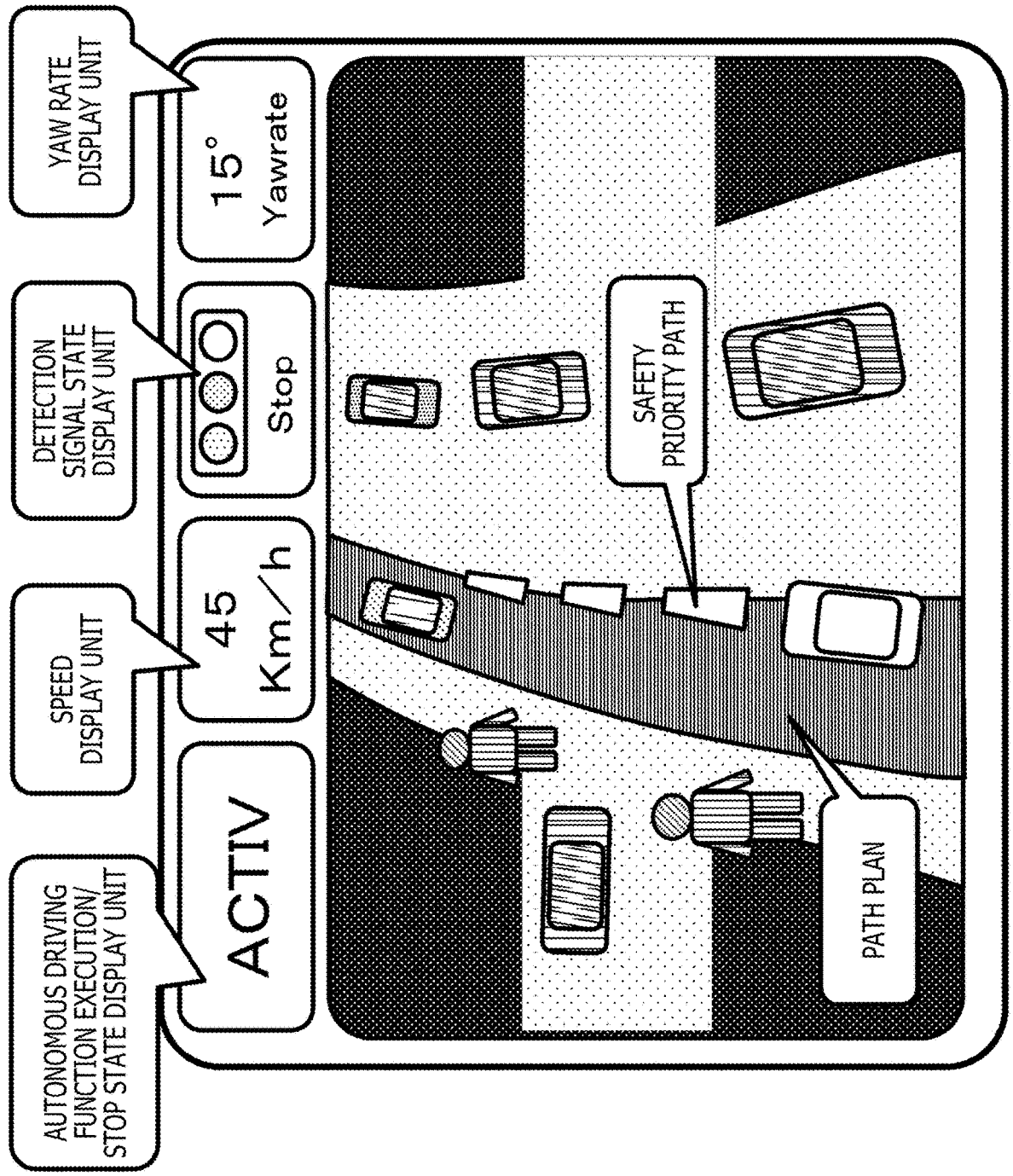
FIG. 25 is a diagram depicting an example of display data in a display unit.

FIG. 25 depicts an example of specific display data displayed on a display unit of the vehicle.

As depicted in FIG. 25, a path plan and a safety priority path set by the autonomous driving vehicle are displayed on the display unit.

An object around 360 degrees is three-dimensionally drawn on a digital map of the display unit. A lane, a crosswalk, and signs are displayed.

Moreover, information indicating an execution/stop state of the autonomous driving function, a traveling speed, a yaw rate, a traffic light recognition result, and the like are displayed in an upper part.

An icon of the displayed traffic light does not necessarily represent an actual traffic light. For example, the color of the traffic light icon turns to red in a case where brake control is necessary, such as braking of a front vehicle.

In a case of recognition of an actual traffic light, this traffic light is displayed in a 3D digital map located in a lower part.

Moreover, a vehicle entrance prohibited space is displayed separately from a vehicle entrance allowed region in the 3D digital map in the lower part.

Furthermore, recognized objects are displayed in colors different for each type of the objects.

A traveling path of the vehicle is displayed with identification using a specific color (e.g., blue) band as a long-term path plan to a destination.

Moreover, a local short-term planning path (safety priority path) is displayed with identification using a band intermittently displayed in a different color (e.g., white).

Note that the short-term planning path (safety priority path) is displayed with a change according to a distance from an obstacle (curvature of the safety priority path) on the basis of a danger level of the obstacle. For example, the danger level changes according to the type of the obstacle (pedestrian or automobile), whether or not the obstacle is movable, and the traveling speed of the own vehicle.

In this manner, the number and the length of the band indicating the short-term planning path (safety priority path) are changeable.

Moreover, a tracking target in vehicles traveling in the surroundings, a safe vehicle, and the like are distinguished and displayed with identification using colors different from colors of others, such as red and green.

For example, a dangerous vehicle in the vehicles traveling in the surroundings is displayed in a color different from colors of others, such as red.

In addition, a vehicle stopping on the side, and an obstacle which may be dangerous or may move in movable obstacles such as a pedestrian is displayed with a mark such as a △ mark or a ! mark above the corresponding obstacle.

The display color may be displayed with a tint different for each danger level, such as display with red for a particularly dangerous obstacle.

Moreover, at the time of a stop of autonomous driving and switching to manual driving, a notification that control authorization is transferred to the driver is displayed.

In a case where a necessity of bending the short-term path (shifting the path away from the obstacle) is recognized, such as a road where many vehicles are parked, and a junction, this situation may be reflected in the long-term path plan beforehand. Information such as information associated with whether the road is such a road where many vehicles are parked is displayed with reference to information indicated by a dynamic map, information provided by VICS (registered trademark), or the like.

For recognizing circumstances beforehand as described above, a video with an aerial view obtained by a drone or the like, a satellite picture, and the like are used as well as the dynamic map already described above. These may be acquired in real time.

Furthermore, for a spot where running out by another vehicle or approach more than expected has occurred as acquired by a camera, a LiDAR, a millimeter-wave radar, an ultrasonic wave or the like during previous traveling, adoptable is such a configuration which displays information reflecting this spot on a map as a dangerous spot according to checking by a human in advance, or automatic determination under a program on the basis of a recognition result of the identical spot during current driving.

In addition, in a case where circumstances obtained by a map or the like beforehand are different from actual circumstances, it is preferable to display information reflecting these different points on the map.

Besides, a recognition result of one or more vehicles ahead may be used for recognition of circumstances beforehand.

The dynamic map information, the information obtained by VICS (registered trademark), the aerial view obtained by a drone, the satellite picture, the recognition result obtained by the own vehicle at the spot identical to the previous spot, the recognition result of the vehicle ahead, and the like as described above may be combined.

[10. Hardware Configuration Example of Respective Devices]

Described next with reference to FIG. 26 will be a hardware configuration example of an information processing apparatus constituting the autonomous traveling control device 100, the robot management server 121, the map information providing server 122, or other servers such as a building management server and a parking lot management server.

The hardware configuration depicted in FIG. 26 presents an example of a hardware configuration applicable to these devices.

A CPU (Central Processing Unit) 301 functions as a data processing unit which executes various types of processing under a program stored in a ROM (Read Only Memory) 302 or a storage unit 308. For example, the CPU 301 executes a process according to the sequence described in the above embodiment. A RAM (Random Access Memory) 303 stores programs executed by the CPU 301, and data. The CPU 301, the ROM 302, and the RAM 303 described herein are connected to each other via a bus 304.

The CPU 301 is connected to an input/output interface 305 via the bus 304. An input unit 306 constituted by various types of switches, a keyboard, a touch panel, a mouse, a microphone, and the like, and an output unit constituted by a display, a speaker, and the like are connected to the input/output interface 305.

The storage unit 308 connected to the input/output interface 305 is constituted by a hard disk or the like, and stores the programs executed by the CPU 301 and various types of data. A communication unit 309 functions as a transmission and reception unit for data communication via a network such as the Internet and a local area network, and communicates with external devices.

A drive 310 connected to the input/output interface 305 drives a removable medium 311 such as a magnetic disk, an optical disk, a magneto-optical disk, and a semiconductor memory like a memory card, and executes data recording or data reading.

[11. Summary of Configuration of Present Disclosure]

The embodiment of the present disclosure has been described in detail with reference to the specific embodiment. However, it is obvious that those skilled in the art are allowed to make corrections or substitutes for the embodiment without departing from the subject matters of the present disclosure. Accordingly, the present invention has been disclosed only in a form of an example. It should not be interpreted that the present invention is limited to this example. The section of the claims should be taken into consideration to determine the subject matters of the present disclosure.

Note that the technology disclosed in the present description can have following configurations.

(1)

An autonomous traveling control device including:

a traveling path determination unit that generates a safety priority path for avoiding passage through or approach to a dangerous region where a contact with another mobile object is possible; and a traveling control unit that executes control causing the own device to travel along the safety priority path generated by the traveling path determination unit.

(2)

The autonomous traveling control device according to (1), in which the traveling path determination unit generates a safety priority path for bypassing the dangerous region.

(3)

The autonomous traveling control device according to (1) or (2), in which the traveling path determination unit generates the safety priority path by correcting a minimum cost path corresponding to a shortest path in a metric map.

(4)

The autonomous traveling control device according to any one of (1) to (3), in which the traveling path determination unit generates a minimum cost path in a topology map, a cost priority path in a metric map on the basis of the minimum cost path in the topology map, and a safety priority path in the metric map by correcting the cost priority path in the metric map.

(5)

The autonomous traveling control device according to any one of (1) to (4), in which the traveling path determination unit acquires or detects position information associated with a dangerous region in a traveling path, and generates a safety priority path for avoiding passing through or approach to the dangerous region.

(6)

The autonomous traveling control device according to any one of (1) to (5), in which the traveling path determination unit generates a safety priority path with reference to dangerous region map data where position information associated with a dangerous region in a traveling path is recorded.

(7)

The autonomous traveling control device according to any one of (1) to (6), in which the traveling path determination unit generates two vectors AB and AC forming a flare angle $\phi$ from a dangerous region representative point A, detects a point B1 where the vector AB of the generated two vectors crosses a line of a distance d from an end at which the own device is travelable, and a point C1 where the vector AC crosses the line of the distance d, and generates a safety priority path containing a connection line connecting the points B1 and C1.

(8)

The autonomous traveling control device according to (7), in which the traveling path determination unit generates a safety priority path by connecting the connection line connecting the points B1 and C1 and a cost priority path in a metric map.

(9)

The autonomous traveling control device according to any one of (1) to (8), in which the traveling path determination unit generates a safety priority path by changing a distance from the dangerous region according to an attribute of a mobile object highly likely to come into contact in the dangerous region.

(10)

The autonomous traveling control device according to any one of (1) to (9), in which the traveling path determination unit executes a traveling path determination process in consideration of a traveling path of another autonomous traveling control device.

(11)

The autonomous traveling control device according to any one of (1) to (10), in which the traveling control unit executes control causing the own device to travel along the safety priority path generated by the traveling path determination unit, and executes traveling control based on sensor detection information.

(12)

An autonomous traveling control system including:

an autonomous traveling device; and a server that transmits a safety priority path to the autonomous traveling device, in which the server generates a safety priority path for avoiding passage through or approach to a dangerous region where a contact between the autonomous traveling device and another mobile object is possible, and transmits generated safety priority path information to the autonomous traveling device, and the autonomous traveling device receives the safety priority path information from the server, and executes control causing the own device to travel along the received safety priority path.

(13)

An autonomous traveling control method executed by an autonomous traveling control device, the autonomous traveling control method including:

a traveling path determination step of generating, by a traveling path determination unit, a safety priority path for avoiding passage through or approach to a dangerous region where a contact with another mobile object is possible; and a traveling control step of executing, by a traveling control unit, control causing the own device to travel along the safety priority path generated by the traveling path determination unit.

Note that a series of processes described in the description may be executed by hardware, software, or a composite configuration of both. In a case of execution of the processes by software, a program where a processing sequence has been recorded may be installed in a memory within a computer incorporated in dedicated hardware, and executed in this form, or may be installed in a general-purpose computer capable of executing various types of processing, and executed in this form. For example, the program may be recorded in a recording medium beforehand. The program may be installed from the recording medium into a computer, or may be received via a network such as a LAN (Local Area Network) and the Internet, and installed in a recording medium such as a built-in hard disk.

Moreover, the respective types of processes described in the description may be executed not only in time series described above, but also in parallel or individually according to a processing ability of a device executing the processes, or as necessary. Furthermore, the system in the present description is a logical set of configurations constituted by a plurality of devices, and the devices of the respective configurations are not required to be contained in an identical housing.

INDUSTRIAL APPLICABILITY

As described above, achieved according to the configuration of the one embodiment of the present disclosure is an autonomous traveling control device which generates a safety priority path for avoiding passage through or approach to a dangerous region where a contact with another mobile object is possible, and travels on the generated safety priority path.

Specifically, for example, the autonomous traveling control device includes a traveling path determination unit which generates a safety priority path for avoiding passage through or approach to a dangerous region where a contact with another mobile object is possible, and a traveling control unit which executes control causing the own device to travel on the safety priority path generated by the traveling path determination unit. The traveling path determination unit generates a cost priority path in a metric map on the basis of a minimum cost path in a topology map, and generates a safety priority path bypassing the dangerous region by correcting the cost priority path in the metric map.

The present configuration achieves an autonomous traveling control device which generates a safety priority path for avoiding passage through or approach to a dangerous region where a contact with another mobile object is possible, and travels on the generated safety priority path.

REFERENCE SIGNS LIST 10, 20: Autonomous traveling robot
31: Junction
100: Autonomous traveling control device
101: Traveling path determination unit
102: Traveling control unit
111: Map data
111a: Topology map data
111b: Metric map data
111c: Dangerous region map data
112: Traveling path data
121: Robot management server
122: Map information providing server
125: Robot information
127: Map data
131: Cost priority path
132: Safety priority path
151: Control unit
152: Input unit
153: Output unit
154: Sensor group
155: Drive unit
156: Communication unit
157: Storage unit
301: CPU
302: ROM
303: RAM
304: Bus
305: Input/output interface
306: Input unit
307: Output unit
308: Storage unit
309: Communication unit
310: Drive
311: Removable medium

The invention claimed is:

1. An autonomous traveling control device comprising:
processor circuitry configured to
generate a safety priority path to avoid passage through or approach of a dangerous region where a contact with another mobile object is possible,
execute a control instruction to control an own device to travel along the safety priority path previously generated,
generate a minimum cost path in a topology map,
generate a cost priority path in a metric map on a basis of the minimum cost path in the topology map, and
correct the cost priority path in the metric map as part of generation of the safety priority path in the metric map.

2. The autonomous traveling control device according to claim 1, wherein the processor circuitry is further configured to generate the safety priority path to bypass the dangerous region.

3. The autonomous traveling control device according to claim 1, wherein the processor circuitry is further configured to generate the safety priority path to include correction of a minimum cost path corresponding to a shortest path in a metric map.

4. The autonomous traveling control device according to claim 1, wherein
the processor circuitry is further configured to
acquire or detect position information associated with the dangerous region that is in a traveling path, and
generate the safety priority path to avoid passage through or approach of the dangerous region.

5. The autonomous traveling control device according to claim 1, wherein the processor circuitry is further configured to generate the safety priority path with reference to dangerous region map data where position information associated with the dangerous region that is in a traveling path is recorded.

6. The autonomous traveling control device according to claim 1, wherein
the processor circuitry is further configured to
generate two vectors AB and AC forming a flare angle $\phi$, from a dangerous region representative point A,
detect a point B1 where the vector AB of the generated two vectors crosses a line of a distance d from an end at which the own device is travelable, and a point C1 where the vector AC crosses the line of the distance d, and
generate the safety priority path to contain a connection line that connects the points B1 and C1.

7. The autonomous traveling control device according to claim 6, wherein the processor circuitry is further configured to generate the safety priority path to include a connection line that the points B1 and C1 and a cost priority path in a metric map.

8. The autonomous traveling control device according to claim 1, wherein the processor circuitry is further configured to, as part of generation of the safety priority path, change a distance from the dangerous region according to an attribute of a mobile object highly likely to come into contact in the dangerous region.

9. The autonomous traveling control device according to claim 1, wherein the processor circuitry is further configured to execute a traveling path determination process in consideration of a traveling path of another autonomous traveling control device.

10. The autonomous traveling control device according to claim 1, wherein the processor circuitry is further configured to cause the own device to travel along the safety priority path that is previously generated, and execute travel control based on sensor detection information.

11. An autonomous traveling control system comprising:
an autonomous traveling device; and
a server that transmits a safety priority path to the autonomous traveling device, wherein
the server is configured to generate a safety priority path to avoid passage through or approach of a dangerous region where a contact between the autonomous traveling device and another mobile object is possible, and transmit generated safety priority path information to the autonomous traveling device, and
the autonomous traveling device is configured to
receive the safety priority path information from the server,
execute control that causes the own device to travel along the received safety priority path,
generate a minimum cost path in a topology map,
generate a cost priority path in a metric map on a basis of the minimum cost path in the topology map, and
correct the cost priority path in the metric map as part of generation of the safety priority path in the metric map.

12. An autonomous traveling control method executed by an autonomous traveling control device, the autonomous traveling control method comprising:
generating, by traveling path determination circuitry, a safety priority path to avoid passage through or approach of a dangerous region where a contact with another mobile object is possible;
executing control to cause the own device to travel along the safety priority path previously generated,
generating a minimum cost path in a topology map;
generating a cost priority path in a metric map on a basis of the minimum cost path in the topology map; and
correcting the cost priority oath in the metric man as Bart of generation of the safety priority path in the metric map.

* * * * *